US012226362B2

(12) United States Patent
Van Varick et al.

(10) Patent No.: US 12,226,362 B2
(45) **Date of Patent: *Feb. 18, 2025**

(54) FOLDABLE WALKING FRAME WITH ERGONOMIC ADJUSTMENT FEATURES

(71) Applicant: CVS Pharmacy, Inc., Woonsocket, RI (US)

(72) Inventors: Robert Beale Van Varick, Yardley, PA (US); Donald Samuel Strum, Princeton, NJ (US); George Benjamin Wintner, Brooklyn, NY (US); Ryan Crist, McFarland, WI (US); Gregory P. Allison, Allentown, PA (US)

(73) Assignee: CVS Pharmacy, Inc., Woonsocket, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/414,054

(22) Filed: Jan. 16, 2024

(65) Prior Publication Data

US 2024/0148595 A1 May 9, 2024

Related U.S. Application Data

(63) Continuation of application No. 17/404,718, filed on Aug. 17, 2021, now Pat. No. 11,877,977.

(Continued)

(51) Int. Cl.
*A61H 3/00* (2006.01)
*A61H 3/04* (2006.01)

(52) U.S. Cl.
CPC ................ *A61H 3/00* (2013.01); *A61H 3/04* (2013.01); *A61H 2003/046* (2013.01); *A61H 2201/0161* (2013.01); *A61H 2201/1638* (2013.01)

(58) Field of Classification Search
CPC ...... A61H 3/00; A61H 3/04; A61H 2003/046; A61H 2201/0161; A61H 2201/1638;
(Continued)

(56) References Cited

U.S. PATENT DOCUMENTS 2,004,089 A 6/1935 Anderson
2,034,934 A 3/1936 Anderson
(Continued)

FOREIGN PATENT DOCUMENTS

CN 2281172 5/1998
CN 2683101 3/2005
(Continued)

OTHER PUBLICATIONS 7 page PDF of machine translation of CN 2683101. (Year: 2005).*
(Continued)

*Primary Examiner* — Robert Canfield
(74) *Attorney, Agent, or Firm* — Sheridan Ross P.C.

(57) ABSTRACT

An improved walker includes an adjustable frame with angled portions that provide an ergonomic interface and enhanced stability for a user. The front of the walker includes a wishbone front support frame. Rather than incorporating multiple front legs extending from the top of the walker to the floor, the wishbone front support frame provides clearance on either side of a center front column. This clearance allows users to position, or maneuver, the walker close to adjacent objects. The handrail portions of the walker are pitched at a downward angle running in a direction from the rear to the front of the walker. This pitch moves the operating position of the user close to the front of walker providing a safe and stable operating position.

20 Claims, 31 Drawing Sheets

Related U.S. Application Data

(60) Provisional application No. 63/066,563, filed on Aug. 17, 2020.

(58) Field of Classification Search
CPC .... A61H 2201/0192; A61H 2201/1635; A61H 3/06; A61H 2201/1418
USPC ........ 135/67, 78; 280/87.01, 87.021, 87.041, 280/87.05, 87.051
See application file for complete search history.

(56) References Cited

U.S. PATENT DOCUMENTS

| | | | | |
|---|---|---|---|---|
| 2,844,396 | A | 7/1958 | Krokos et al. | |
| 4,528,998 | A | 7/1985 | Gamm | |
| 5,116,294 | A | 5/1992 | Findlay | |
| 5,188,139 | A | 2/1993 | Garelick | |
| 5,529,425 | A | 6/1996 | Spies et al. | |
| D420,624 | S | 2/2000 | Gonzalez | |
| 6,453,921 | B1 | 9/2002 | Rost | |
| D480,666 | S | 10/2003 | Owens | |
| 6,634,660 | B2 * | 10/2003 | Miller | A61H 3/04 482/68 |
| 6,729,342 | B2 | 5/2004 | Serhan | |
| D494,109 | S | 8/2004 | Karasin et al. | |
| 6,886,575 | B2 | 5/2005 | Diamond | |
| D535,220 | S | 1/2007 | Wu | |
| 7,497,226 | B2 | 3/2009 | Li et al. | |
| 7,703,465 | B2 | 4/2010 | Diamond | |
| 8,523,211 | B2 * | 9/2013 | Mailahn | A61H 3/04 280/263 |
| 8,820,338 | B1 | 9/2014 | Catricala et al. | |
| D751,951 | S | 3/2016 | Andersen et al. | |
| D793,915 | S | 8/2017 | Wang et al. | |
| 9,775,767 | B1 | 10/2017 | Khaligh | |
| 10,470,963 | B1 | 11/2019 | Donahoe et al. | |
| 10,717,491 | B1 * | 7/2020 | Neville | B62K 15/008 |
| D902,790 | S | 11/2020 | Nowak et al. | |
| 10,932,984 | B2 * | 3/2021 | Mahathalagalage | F16D 49/04 |
| D966,949 | S | 10/2022 | Van Varick et al. | |
| D977,374 | S | 2/2023 | Van Varick et al. | |
| D977,375 | S | 2/2023 | Van Varick et al. | |
| 11,877,977 | B2 | 1/2024 | Van Varick et al. | |
| 2006/0278260 | A1 * | 12/2006 | Su | A45B 7/00 135/67 |
| 2007/0023073 | A1 * | 2/2007 | Su | A61H 3/04 482/68 |
| 2007/0182116 | A1 * | 8/2007 | Davey | B62K 3/16 280/87.05 |
| 2008/0284125 | A1 * | 11/2008 | Ramm | B62K 3/002 280/263 |
| 2009/0058036 | A1 * | 3/2009 | Hoepner | A61H 3/04 280/267 |
| 2010/0313924 | A1 | 12/2010 | Cho | |
| 2011/0109058 | A1 * | 5/2011 | Janis | A61H 3/04 280/263 |
| 2014/0109944 | A1 | 4/2014 | Triolo et al. | |
| 2015/0240849 | A1 | 8/2015 | Fang | |
| 2017/0209319 | A1 * | 7/2017 | Fawcett | A61G 5/125 |
| 2018/0084876 | A1 | 3/2018 | Parkinson et al. | |
| 2019/0105221 | A1 * | 4/2019 | Pan | A61G 5/08 |
| 2019/0105222 | A1 * | 4/2019 | Fellingham | A61H 1/00 |
| 2019/0350797 | A1 * | 11/2019 | Heinrich | B62K 5/003 |
| 2020/0317168 | A1 | 10/2020 | Mahathalagalage | |
| 2021/0154065 | A1 | 5/2021 | Brown et al. | |
| 2021/0236022 | A1 * | 8/2021 | Shugert | A61B 5/1128 |
| 2021/0244600 | A1 * | 8/2021 | English | A61H 3/00 |
| 2022/0063753 | A1 * | 3/2022 | Evans | A61H 3/04 |
| 2022/0151860 | A1 * | 5/2022 | Shugert | A63B 23/03541 |
| 2023/0225926 | A1 * | 7/2023 | Li | A61H 3/04 280/87.05 |

FOREIGN PATENT DOCUMENTS

| | | |
|---|---|---|
| CN | 1891187 | 1/2007 |
| CN | 101594844 | 12/2009 |
| CN | 105189248 | 12/2015 |
| CN | 208291411 | 12/2018 |
| CN | 109789049 | 5/2019 |
| CN | 110339028 | 10/2019 |
| CN | 210785280 | 6/2020 |
| CN | 111685974 | 9/2020 |
| FR | 71633 | 1/1960 |
| TW | M330950 | 4/2008 |

OTHER PUBLICATIONS

Official Action with Machine Translation for China Patent Application No. 20211946222.2, dated Apr. 30, 2024 22 pages.
Notice of Allowance (with English translation) for China Patent Application No. 202130819152.5, dated Apr. 11, 2022, 4 pages.
Notice of Allowance for U.S. Appl. No. 17/404,718, dated Sep. 12, 2023 9 pages.
Notice of Allowance for U.S. Appl. No. 29/840,047, dated Sep. 30, 2022, 6 pages.
Notice of Allowance for U.S. Appl. No. 29/840,043, dated Sep. 30, 2022, 7 pages.
Official Action for U.S. Appl. No. 29/818,916, dated Mar. 29, 2022, 6 pages. Restriction Requirement.
Notice of Allowance for U.S. Appl. No. 29/818,916, dated Jun. 16, 2022, 8 pages.

* cited by examiner

600A

600A

FOLDABLE WALKING FRAME WITH ERGONOMIC ADJUSTMENT FEATURES

CROSS-REFERENCE TO RELATED APPLICATIONS

The present application is a continuation of U.S. patent application Ser. No. 17/404,718, filed on Aug. 17, 2021, which claims the benefit of and priority, under 35 U.S.C. § 119 (e), to U.S. Provisional Application Ser. No. 63/066,563, filed on Aug. 17, 2020, entitled "Foldable Walking Frame with Ergonomic Adjustment Features," the entire disclosures of which are hereby incorporated herein by reference, in their entirety, for all that it they teach and for all purposes.

BACKGROUND

The present disclosure is generally directed to walking frames and, in particular, toward walking frames including ergonomic safety and access features.

Walking frames generally provide users with additional stability and support while moving from place to place. As can be appreciated, a walking frame is a useful device for any person who may be undergoing physical therapy, who may have limited strength, or who may have some type of disability.

Most walking frames surround a user with an arrangement of metal tubing and rails that are designed to support the user while moving. The design aesthetic of traditional walking frames is unattractive and, as such, many users have associated walking frames with a stigma of inability or immobility. Moreover, conventional walking frame designs are uncomfortable to use, difficult to adjust, and cumbersome to store or transport.

Given these, and other, shortcomings of traditional walking frame designs, people who may need additional assistance with mobility may be loath to use a walking frame. Those who choose not to use the walking frame may suffer from subsequent accidents due to lack of support. On the other hand, those who use a traditional walking frame may feel uncomfortable using an unattractive appliance that has been traditionally associated with immobility. Either of these scenarios is completely unacceptable for users who wish to maintain their mobility as well as the dignity that they deserve.

BRIEF SUMMARY

It is with respect to the above issues and other problems that the examples presented herein were contemplated. The present disclosure provides a walking frame, or walker, having a pleasing, clean, modern, and elegant aesthetic that accompanies a number of enhanced comfort and safety features. In some examples, the walker comprises a frame including a wishbone front support frame, ergonomically inclined hand rails, sturdy joint construction, and quick-adjust features. The wishbone front support frame may comprise a wishbone-shaped frame that provides clearance on either side of a center front column. This clearance allows a user to position, or maneuver, the walker closer to tables, chairs, or other edges and surfaces than would otherwise be possible using a traditional multiple-leg walker.

In one aspect, a walker includes a wishbone-shaped support frame arranged at a front side of the walker and having a center column extending a length from a first end to a second end, the wishbone-shaped support frame having a first attachment leg attached to the first end and extending away from a first side of the center column and a second attachment leg attached to the first end and extending away from a second side of the center column opposite the first side of the center column; a telescoping column disposed at least partially inside a hollow space of the second end of the center column; a handlebar attached to the telescoping column, the handlebar having a first tube end and a second tube end disposed opposite the first tube end; a first handrail portion attached to the first tube end of the handlebar, wherein the first handrail portion extends from the handlebar at the front side of the walker to a rear side of the walker; and a second handrail portion attached to the second tube end of the handlebar, wherein the second handrail portion extends from the handlebar at the front side of the walker to the rear side of the walker, wherein the first handrail portion and the second handrail portion are disposed in a common plane, and wherein the common plane angles from a first height dimension measured at the front side of the walker to a higher second height dimension measured at the rear side of the walker.

Examples may include one of the following features, or any combination thereof. The walker comprising a first back leg attached to the first handrail portion at the rear side of the walker; and a second back leg attached to the second handrail portion at the rear side of the walker. Aspects of the above walker may include at least one foot that inserts into a hollow end of the first attachment leg, the second attachment leg, the first back leg, and the second back leg, wherein the at least one foot comprises a foot body extending from an insert end to a grip end, the foot body comprising a protrusion disposed at the insert end that clips into the hollow end via at least one locking spring pin; a grip foot connected to the grip end of the foot body; a shroud that surrounds the foot body and a portion of the grip foot and comprises a gliding surface, wherein the shroud moves axially between an uncompressed sliding position where the gliding surface extends beyond the grip foot in a direction away from the hollow end concealing the grip foot to a compressed gripping position where the gliding surface is disposed closer to the hollow end than the grip foot is to the hollow end, and wherein the grip foot, in the compressed state is exposed from the shroud. Aspects of the above walker may include wherein the first handrail portion and the first back leg are rotationally engaged with the handlebar at the first tube end, wherein the second handrail portion and the second back leg are rotationally engaged with the handlebar at second tube end, wherein the first handrail portion and the first back leg are arranged on a first width side of the walker in an open state of the walker and the second handrail portion and the second back leg are arranged on a second width side of the walker in the open state of the walker, and wherein the second width side is arranged opposite the first width side. Aspects of the above walker may include wherein a fold-lock mechanism in an engaged state with a first locking receptacle of the handlebar rotationally locks the first handrail portion and the first back leg relative to the handlebar in the open state. Aspects of the above walker may include wherein the fold-lock mechanism in a disengaged state with the first locking receptacle of the handlebar rotationally unlocks the first handrail portion and the first back leg relative to the handlebar. Aspects of the above walker may include wherein the fold-lock mechanism in an engaged state with a second locking receptacle of the handlebar rotationally locks the first handrail portion and the first back leg relative to the handlebar in a folded state of the walker. Aspects of the above walker may include wherein, in the folded state, the first back leg is arranged adjacent the second width side, wherein the second back leg is arranged adjacent the first width side, wherein an open carry area of the center column is disposed between the first back leg and the second back leg, and wherein the open carry area of the center column is unobstructed from the front side of the walker and the rear side of the walker. Aspects of the above walker may include wherein, in the open state, the first handrail portion and second handrail portion are symmetrical about a center plane running through the center column and extending from the front side of the walker to the rear side of the walker. Aspects of the above walker may include wherein, in the open state, the first handrail portion is flared outwardly from the center plane at a first non-zero angle running from the front side of the walker to the rear side of the walker. Aspects of the above walker may include wherein, in the open state, the second handrail portion is flared outwardly from the center plane at a second non-zero angle running from the front side of the walker to the rear side of the walker. Aspects of the above walker may include wherein, in the open state, the first non-zero angle and the second non-zero angle are identical, and a distance between the first handrail portion and the second handrail portion at the rear side of the walker is greater than a distance between the first handrail portion and the second handrail portion at the front side of the walker. Aspects of the above walker may include wherein the fold-lock mechanism further comprises: a lock receiver body rotationally fixed relative to the handlebar and comprising a body portion disposed inside the first tube end of the handlebar, wherein the first locking receptacle is disposed in the body portion, and wherein the second locking receptacle is disposed in the body portion offset from the first locking receptacle. Aspects of the above walker may include wherein the fold-lock mechanism further comprises: an internal lock housing rotationally fixed relative to the handlebar and comprising a housing portion disposed inside an end of the first handrail portion adjacent the first tube end of the handlebar; and a locking pin axially keyed to the internal lock housing and movable between a retracted position inside the end of the first handrail portion adjacent the first tube end of the handlebar when the fold-lock mechanism is in the disengaged state and an extended position with one of the first locking receptacle and the second locking receptacle when fold-lock mechanism is in the engaged state. Aspects of the above walker may include wherein the fold-lock mechanism further comprises: a trigger body that slides along an outer diameter of the first handrail portion between a first position and a second position, wherein the first position corresponds to the engaged state of the fold-lock mechanism, and wherein the second position corresponds to the disengaged state of the fold-lock mechanism. Aspects of the above walker may include wherein the locking pin comprises a tang extending in a radial direction through a slot in the end of the first handrail portion adjacent the first tube end of the handlebar and fixed in the trigger body, wherein a movement of the trigger body in a slide direction moves the tang and the locking pin in the slide direction. Aspects of the above walker may include wherein an anti-rattle sleeve is connected to the first back leg and disposed between an outer diameter of the first handrail portion and an inner diameter of the first back leg. Aspects of the above walker may include wherein the first handrail portion comprises a tubular rail comprising: a first rail section that is axially aligned with and adjacent the first tube end of the handlebar; a support rail section connected to the first rail section and disposed at a first angle relative to the first rail section; and a second rail section connected to the support rail section and disposed at a second angle relative to the first rail section and a third angle relative to the support rail section, wherein the first angle, the second angle, and the third angle are non-zero angles. Aspects of the above walker may include a grip sleeve connected to the first handrail portion and extending a continuous length from the support rail section to the second rail section.

In another aspect, a walking frame includes a wishbone-shaped support defining a front plane of the walking frame, the wishbone-shaped support comprising: a column extending a height in the front plane from a first end to a second end; a first leg connected to the column and branching in a first direction away from the column in the front plane to a first side of the walking frame; and a second leg connected to the column and branching in a second direction away from the column in the front plane to a second side of the walking frame, wherein the second side is disposed opposite the first side; an inner column disposed at least partially inside a hollow of the column and comprising a stem arranged on an exposed end of the inner column, the inner column disposed in the front plane slidably engaged with the inner column along a portion of the height of the column; a handlebar comprising a first tube end disposed on the first side, a second tube end disposed on the second side, and a center disposed between the first tube end and the second tube end, wherein the center is attached to the stem of the inner column; and a first grip tube connected to the first tube end on the first side, the first grip tube comprising a first rail section axially aligned with the first tube end, a support rail section connected to the first rail section and bent at a first angle relative to the first rail section disposing the support rail section in an inclined plane, and a second rail section connected to the support rail section and bent at second angle relative to the first angle, wherein the inclined plane intersects with the front plane, and is angled from a lowest point adjacent the first rail section to a highest point adjacent the second rail section.

Aspects of the above walking frame may include wherein the first grip tube is rotationally engaged with the handlebar at the first tube end, wherein the first grip tube has a first locked position in an opened state of the walking frame where the second rail section is disposed on the first side, and wherein the first grip tube has a second locked position in a folded state of the walking frame where the second rail section is disposed adjacent the second side and the front plane of the walking frame. Aspects of the above walking frame may include a second grip tube connected to the second tube end on the second side, the second grip tube comprising a first rail section axially aligned with the second tube end, a support rail section connected to the first rail section of the second grip tube and bent at the first angle relative to the first rail section of the second grip tube, wherein the support rail section of the second grip tube is disposed in the inclined plane when the walking frame is in the opened state, wherein the second grip tube is rotationally engaged with the handlebar at the second tube end, wherein the second grip tube has a first locked position in the opened state of the walking frame where the second rail section of the second grip tube is disposed on the first side, and wherein the second grip tube has a second locked position in the folded state of the walking frame where the second rail section of the second grip tube is disposed adjacent the first side and the front plane of the walking frame. Aspects of the above walking frame may include a first back leg attached to the second rail section of the first grip tube; and a second back leg attached to the second rail section of the second grip tube, wherein an open carry area of the column is disposed between the first back leg adjacent the second side and the second back leg adjacent the first side, and wherein the open carry area of the center column is unobstructed from a front side of the walking frame and a rear side of the walking frame when the walking frame is in the folded state.

In yet another aspect, a walking frame includes a wishbone-shaped support defining a front plane of the walking frame, the wishbone-shaped support comprising: a column extending a height in the front plane from a first end to a second end; a first leg connected to the column and branching in a first direction away from the column in the front plane to a first side of the walking frame; and a second leg connected to the column and branching in a second direction away from the column in the front plane to a second side of the walking frame, wherein the second side is disposed opposite the first side; an inner column disposed at least partially inside a hollow of the column and comprising a stem arranged on an exposed end of the inner column, the inner column disposed in the front plane slidably engaged with the inner column along a portion of the height of the column; a handlebar comprising a first tube end disposed on the first side, a second tube end disposed on the second side, and a center disposed between the first tube end and the second tube end, wherein the center is attached to the stem of the inner column; a first grip tube rotationally attached to the handlebar at the first tube end on the first side, the first grip tube comprising a first rail section axially aligned with the first tube end, a support rail section connected to the first rail section and bent at a first angle relative to the first rail section disposing the support rail section in an inclined plane, and a second rail section connected to the support rail section and bent at second angle relative to the first angle, wherein the inclined plane intersects with the front plane and is angled from a lowest point adjacent the first rail section to a highest point adjacent the second rail section, wherein the first grip tube has a first locked position in an opened state of the walking frame where the second rail section is disposed on the first side, and wherein the first grip tube has a second locked position in a folded state of the walking frame where the second rail section is disposed adjacent the second side and the front plane of the walking frame.

In one aspect, a walker includes a wishbone-shaped support frame arranged at a front side of the walker and having a center column extending a length from a first end to a second end, the wishbone-shaped support frame having a first attachment leg attached to the first end and extending away from a first side of the center column and a second attachment leg attached to the first end and extending away from a second side of the center column opposite the first side of the center column; a telescoping column disposed at least partially inside a hollow space of the second end of the center column; a handlebar attached to the telescoping column, the handlebar having a first tube end and a second tube end disposed opposite the first tube end; a first handrail portion attached to the first tube end of the handlebar, wherein the first handrail portion extends from the handlebar at the front side of the walker to a rear side of the walker; and a second handrail portion attached to the second tube end of the handlebar, wherein the second handrail portion extends from the handlebar at the front side of the walker to the rear side of the walker, wherein the first handrail and the second handrail are disposed in a common plane, and wherein the common plane angles from a first height dimension measured at the front side of the walker to a higher second height dimension measured at the rear side of the walker.

Examples may include one of the following features, or any combination thereof. Aspects of the above walker may further comprise: a first back leg attached to the first handrail portion at the rear side of the walker; and a second back leg attached to the second handrail portion at the rear side of the walker. Aspects of the above walker may include wherein the first handrail portion and the first back leg are rotationally engaged with the handlebar at the first tube end, wherein the second handrail portion and the second back leg are rotationally engaged with the handlebar at second tube end, wherein the first handrail portion and the first back leg are arranged on a first width side of the walker in an open state of the walker and the second handrail portion and the second back leg are arranged on a second width side of the walker in the open state of the walker, and wherein the second width side is arranged opposite the first width side. Aspects of the above walker may include wherein a fold-lock mechanism in an engaged state with a first locking receptacle of the handlebar rotationally locks the first handrail portion and the first back leg relative to the handlebar in the open state. Aspects of the above walker may include wherein the fold-lock mechanism in a disengaged state with the first locking receptacle of the handlebar rotationally unlocks the first handrail portion and the first back leg relative to the handlebar. Aspects of the above walker may include wherein the fold-lock mechanism in an engaged state with a second locking receptacle of the handlebar rotationally locks the first handrail portion and the first back leg relative to the handlebar in a folded state of the walker.

In one example, the walker may include interchangeable or exchangeable floor contact support elements. For instance, the front floor contact support elements may be selected from at least one of wheel assemblies and foot assemblies. The wheel assemblies may include a brake element that independently locks each wheel. In some examples, the wheel assemblies may comprise a friction hub that provide some resistance to rolling. The foot assemblies may include an active contact system that allows the foot to easily glide over surfaces when dragged, or lifted, and that provides a nonslip gripped support when weight is applied to the walker.

In some examples, the walker may be collapsed from an "open" position or state to a "folded" position or state. For example, the walker may include a fold-lock mechanism that, when actuated, allows the rear legs to fold relative to the front of the walker. In the folded state, the walker may take up less than half of the depth of the walker when in the open state. The walker may be carried by the center front column of the wishbone front support frame. In one example, the center of gravity of the walker, when in the folded position, may be located at a point along the center front column. This arrangement of the center of gravity may aid in the balance of the walker when carrying in the folded state.

The front and rear of the walker may be adjusted using metal buttons, or pins, that are spring-biased in a direction of a series of adjustment holes in the various leg and column members of the walker. In one example, when a desired height of the legs is determined, a user may press the button through the adjustment holes, move the leg (e.g., via a telescopic, or axial, translation, etc.) to the desired height dimension, and allow the button to spring into the closest adjustment hole at the desired height dimension. In some examples, the walker may include a plurality of anti-rattle features. For example, the center front column may comprise a cam-lock sleeve that at least partially radially clamps the inner front column to the center front column of the wishbone front support frame. Additionally or alternatively, the end of the back legs of the walker may comprise an anti-rattle sleeve that contacts the outer diameter, or periphery, of the grip tube. This anti-rattle sleeve may be made from a plastic material that is toleranced to contact the inner diameter, or periphery, of the back leg while simultaneously contacting the outer diameter, or periphery, of the grip tube that is at least partially disposed within the back leg, or vice versa. Stated another way, each anti-rattle sleeve may provide a secure slip-fit between a grip tube and a respective back leg of the walker.

In some examples, the walker may be designed such that the handrail portion of the framework (e.g., including the grip sleeves, etc.) is inclined, or angled, such that the handrail portion slopes from the rear downward toward the front of the walker. This angle, or pitch forward, may allow a user to ergonomically move closer to the front of the walker. Among other things, this serves to position the user in a center forward position in the frame of the walker during use providing the user with increased stability (e.g., compared to conventional walkers that position the user further to the rear of the walker). Additionally, the angle of the handrail portion matches, or closely matches, the natural angle of a person while moving. As described herein, the closer the angle of the handrails to the natural position and angle of a user's hands during use results in an ergonomic interface for the user. This ergonomic interface reduces stress on the user, enhances gait, and provides a safer operation of the walker during use.

The preceding is a simplified summary of the disclosure to provide an understanding of some aspects of the disclosure. This summary is neither an extensive nor exhaustive overview of the disclosure and its various aspects, examples, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, examples, and configurations of the disclosure are possible utilizing, alone or in combination, one or more of the features set forth above or described in detail below. All examples and features mentioned above can be combined in any technically possible way.

Additional features and advantages are described herein and will be apparent from the following Detailed Description and the figures.

DETAILED DESCRIPTION

Figure 1A:
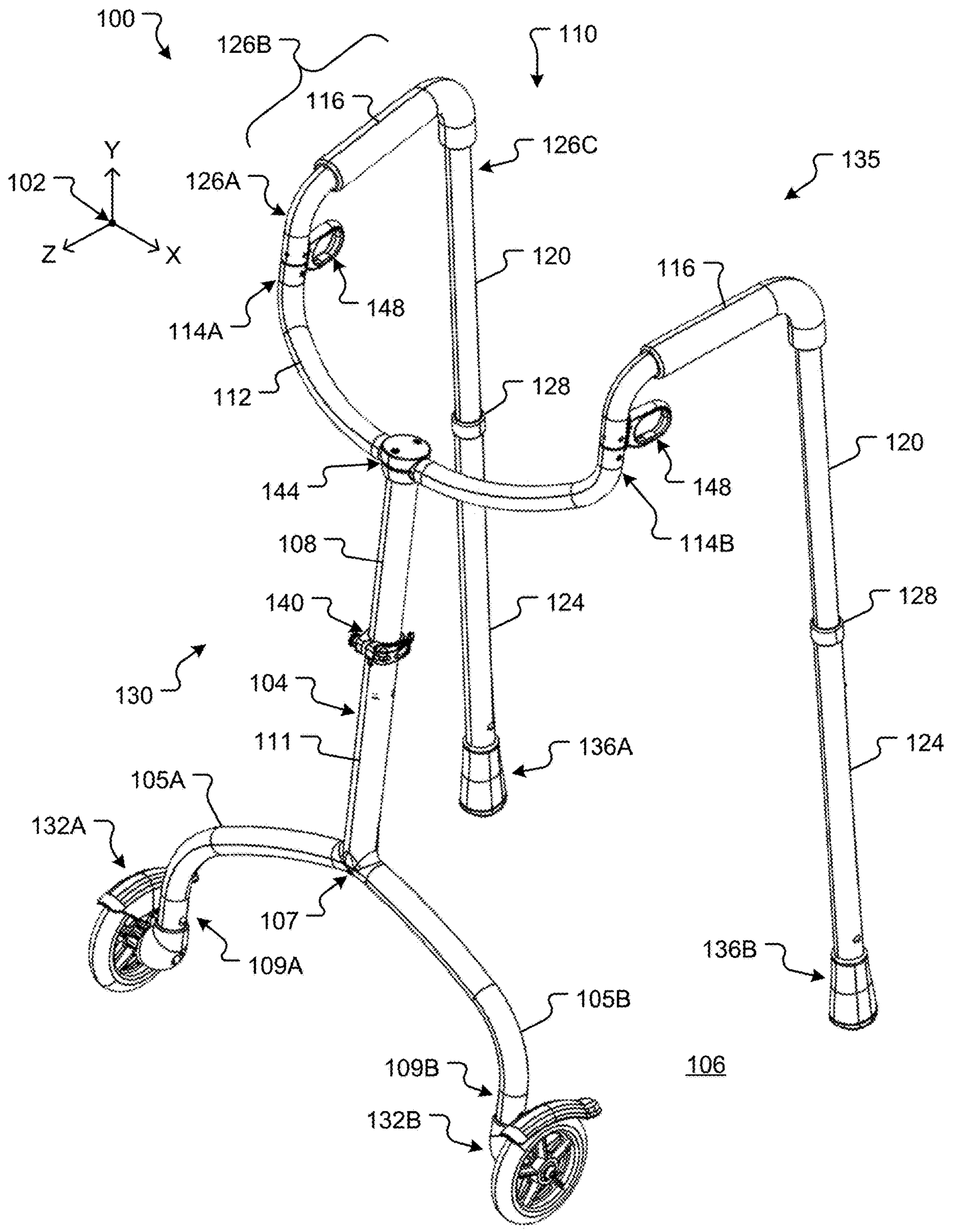
FIG. 1A is a perspective view of a walker in an open state in accordance with examples of the present disclosure.

Before any examples of the disclosure are explained, it is to be understood that the disclosure is not limited in its application to the details of construction and the arrangement of components set forth in the following description or illustrated in the following drawings. The disclosure is capable of other examples and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The claims of the instant application are not limited to the ornamental designs of the various articles and examples shown in the accompanying figures. Moreover, the figures are not intended to illustrate the only available ornamental designs of the various articles and examples described herein. As can be appreciated by a person having ordinary skill in the art, numerous alternative design options are available for the disclosed articles that could achieve the same functionality as described and/or claimed herein.

FIGS. 1A-1D show various views of the walker 100, or walking frame, in accordance with examples of the present disclosure. The walker 100 is shown in particular configurations (or shown to have a particular shape/design), but it should be appreciated that this is one of many possible configurations/shapes/designs. The walker 100 may be defined in terms of a top side 110, a front side 130, and a rear side 135 and/or with reference to a coordinate system 102. The coordinate system 102, as shown in any of the figures, includes three-dimensions comprising an X-axis, a Y-axis, and a Z-axis. Additionally or alternatively, the coordinate system 102 may be used to define planes (e.g., the XY-plane, the XZ-plane, and the YZ-plane) of the walker 100. These planes may be disposed orthogonal, or at 90 degrees, to one another. While the origin of the coordinate system 102 may be placed at any point on or near the components of the walker 100, for the purposes of description, the axes of the coordinate system 102 are always disposed along the same directions from figure to figure. In some examples, reference may be made to dimensions, angles, directions, relative positions, and/or movements associated with one or more components of the walker 100 with respect to the coordinate system 102. For instance, the width of the walker 100 may be defined as a dimension along the X-axis, the height of the walker 100 may be defined as dimension along the Y-axis, and the depth of the walker 100 may be defined as a dimension along the Z-axis of the coordinate system 102. Additionally or alternatively, the width of components of the walker 100 may be defined as a dimension along the X-axis, the height of the components of the walker 100 may be defined as dimension along the Y-axis, and the depth of the components of the walker 100 may be defined as a dimension along the Z-axis of the coordinate system 102.

In addition, reference may be made herein to a width, depth, and/or height of the walker 100 and/or the various components that make up the walker 100 when arranged in a freestanding state. In this example, the term "height" may refer to a dimension running along a direction orthogonal to the ground plane, the term "width" may refer to a dimension running along a side-to-side direction parallel to the ground plane, and the term "depth" may refer to a dimension running along a front-to-back direction that is orthogonal to the width and parallel to the ground plane.

The walker 100 may comprise a frame defined by a wishbone front support frame 104, an inner front column 108, a handlebar 112, grip tubes 120, back legs 124, front attachments 132A-132B, and rear attachments 136A-136B. The frame is shown in particular configurations (or shown to have a particular shape/design), but it should be appreciated that this is one of many possible configurations/shapes/designs. As provided herein the front attachments 132A-132B and/or the rear attachments 136A-136B may be selected from at least one wheel assembly 300 and foot assembly 400 (described in conjunction with FIGS. 3A-4D) to provide a particular configuration of the walker 100. In any event, a user may contact the grip sleeves 116 of the walker 100 and support a weight of the user via contact through the frame of the walker 100 with the floor 106 or other surface.

In some examples, the front side 130 of the walker 100 may comprise a wishbone front support frame 104 that includes a center front column 111 attached to two front attachment legs 105A, 105B. The wishbone front support frame 104 is shown in a particular configuration (or shown to have a particular shape/design), but it should be appreciated that this is one of many possible configurations/shapes/designs. Among other things, the wishbone front support frame 104 provides clearance on either side of the center front column 111. This clearance allows a user to position, or maneuver, the walker 100 close to tables, chairs, or other edges and surfaces than would otherwise be possible using a traditional multiple-leg walker. The wishbone front support frame 104 may define a front plane of the walker 100. The front plane may pass through the center front column 111, the first attachment leg 105A, the second attachment leg 105B, and the inner front column 108.

The front attachment legs 105A, 105B of the wishbone front support frame 104 may flare, or branch, outwardly from opposite sides of the center front column 111 and terminate at respective tube connection ends 109A, 109B. For instance, the first attachment leg 105A may be connected to the center front column 111 at a joint 107 and branch outwardly in a first direction away from the center front column 111 in the front plane to a first side of the walker 100. The second attachment leg 105B may be connected to the center front column 111 at the joint 107 and branch outwardly in a second direction away from the center front column 111 in the front plane to a second side of the walker 100. The first side and the second side are disposed opposite one another. Front attachments 132A-132B may be attached to respective tube ends of these front attachment legs 105A, 105B of the wishbone front support frame 104. For example, the first attachment leg 105A may comprise a first connection end 109A that includes a hollow space to receive a portion of the first front attachment 132A, and the second attachment leg 105B may comprise a second connection end 109B that includes a hollow space to receive a portion of the second front attachment 132B. In addition to the hollow spaces, each of the connection ends 109A, 109B may comprise at least one receptacle that receives a corresponding locking pin (e.g., a button, pin, spring pin, or other mechanical element etc.) of the front attachments 132A, 132B. The locking pin may selectively lock the front attachments 132A, 132B to the wishbone front support frame 104 allowing for quick replacement and/or removal.

The wishbone front support frame 104 may interconnect with, or receive, an inner front column 108. In one example, the inner front column 108 may be at least partially disposed within the center front column 111 of the wishbone front support frame 104. The inner front column 108 may be adjusted axially relative to the center front column 111 of the wishbone front support frame 104 to adjust an overall front height of the walker 100. When adjusted to a desired, or predetermined, height, the inner front column 108 may be secured relative to the center front column 111 of the wishbone front support frame 104 via a cam-lock sleeve 140 and/or a locking pin 152. The cam-lock sleeve 140 may secure the inner front column 108 to the wishbone front support frame 104 by providing a radial clamping force from an end of the center front column 111 onto the inner front column 108. Among other things, this cam-lock sleeve 140 may prevent rattling or movement (e.g., radial, or lateral, etc.) of the inner front column 108 relative to the center front column 111 and wishbone front support frame 104.

The inner front column 108 may be structured as a tube, or bar, having a stem 144 disposed at a first end and a locking pin 152 (e.g., a button, pin, spring pin, or other mechanical element) disposed at the opposite second end. The inner front column 108 is shown in a particular configuration (or shown to have a particular shape/design), but it should be appreciated that this is one of many possible configurations/shapes/designs. The second end may be inserted and maintained inside a cavity of the center front column 111. The stem 144 may comprise a handlebar clamp such as a plate that fastens to the inner front column 108 via one or more fasteners. The stem 144 may be similar, if not identical, to bicycle stems and clamps, such as radial clamps, screw clamps, other fastener-and-plate clamps, etc., and/or combinations thereof. In any event, the stem 144 may clamp, fasten, or otherwise retain a handlebar 112 of the walker 100.

In some examples, the stem 144 may be disposed at a center of the handlebar 112. The handlebar 112 may extend from the center outwardly to either side of the walker 100. The handlebar 112 is shown in a particular configuration (or shown to have a particular shape/design), but it should be appreciated that this is one of many possible configurations/shapes/designs. In some examples, the handlebar 112 may be bent at opposing tube ends 114A, 114B and include an interconnection with respective grip tubes 120. In one example, the interconnection may include a rotational attachment disposed between tube ends 114A, 114B of the handlebar 112 and ends of respective grip tubes 120. The first tube end 114A may be disposed on the first side of the walker 100 and the second tube end 114B may be disposed on the second side of the walker 100.

The grip tubes 120 may extend from a first rail section 126A axially aligned with the first tube end 114A, to a support rail section 126B arranged at an angle to the first rail section 126A, and then to a second rail section 126C arranged at a rear side 135 of the walker 100. The grip tubes 120 are shown in a particular configuration (or shown to have a particular shape/design), but it should be appreciated that this is one of many possible configurations/shapes/designs. The second rail section 126C may be angled downward in a direction toward the floor 106. The support rail section 126B of the grip tube 120 may serve as a handrail portion of the walker 100. In one example, the support rail section 126B may be covered with a grip sleeve 116. In some examples, a portion of the support rail section 126B and a portion of the second rail section 126C may be covered by a grip sleeve 116. The grip sleeve 116 may extend from the portion of the support rail section 126B to the second rail section 126C in a continuous, uninterrupted, length. In any event, the grip sleeve 116 may comprise a foam, thermoplastic elastomer, silicone, or gel sleeve material that is disposed around the grip tube 120 at least at the support rail section 126B of the walker 100. In one example, the material of the grip sleeve 116 may cover a plastic clamshell that contacts the grip tube 120. The grip sleeve 116 may be rotationally and/or axially fixed to the grip tube 120. In one example, the grip sleeve 116 and/or portions thereof may be overmolded onto the grip tube 120.

At the rear side 135 of the walker 100, each grip tube 120 may interconnect with a respective back leg 124. The back legs 124 are shown in a particular configuration (or shown to have a particular shape/design), but it should be appreciated that this is one of many possible configurations/shapes/designs. The interconnection between the grip tube 120 and the back leg 124 may be similar, if not identical, to the interconnection between the inner front column 108 and the wishbone front support frame 104. For instance, the grip tube 120 may be inserted into a cavity, or hollow space, of the back leg 124 in a telescopic fashion. Alternatively, an end of the back leg 124 may be inserted into a cavity, or hollow space, of the grip tube 120 in a telescopic fashion. An anti-rattle sleeve may be connected to the back leg 124 disposed between an outer diameter of the grip tube 120 and an inner diameter of the 124. The anti-rattle sleeve 128 may be made from a plastic material that fills a gap between the grip tube 120 and back leg 124. The anti-rattle sleeve 128 may provide a secure slip-fit between a grip tube 120 and a respective back leg 124 of the walker 100. In one example, each grip tube 120 may comprise a locking pin 152 disposed adjacent to the end that inserts into the back leg 124. The locking pin 152 may be shaped as a button that is sized to engage with an adjustment hole of a series of rear height adjustment holes 160 disposed along an axial length of the back leg 124. The locking pin 152 may be spring-biased to move into the adjustment hole from an inside of the back leg 124 through the adjustment hole to an outside of the back leg 124.

The back legs 124 may comprise respective rear attachments 136A-136B. In one example, the rear attachments 136A-136B may be configured as an active foot assembly as described, in greater detail, in conjunction with FIGS. 4A-4D. The first rear attachment 136A may be disposed on a first side of the walker 100 when in an opened, used, state and the second rear attachment 136B may be disposed on a second side of the walker 100 when in the opened state. In any event the rear attachments 136A-136B may contact the walker 100 during use.

Figure 1B:
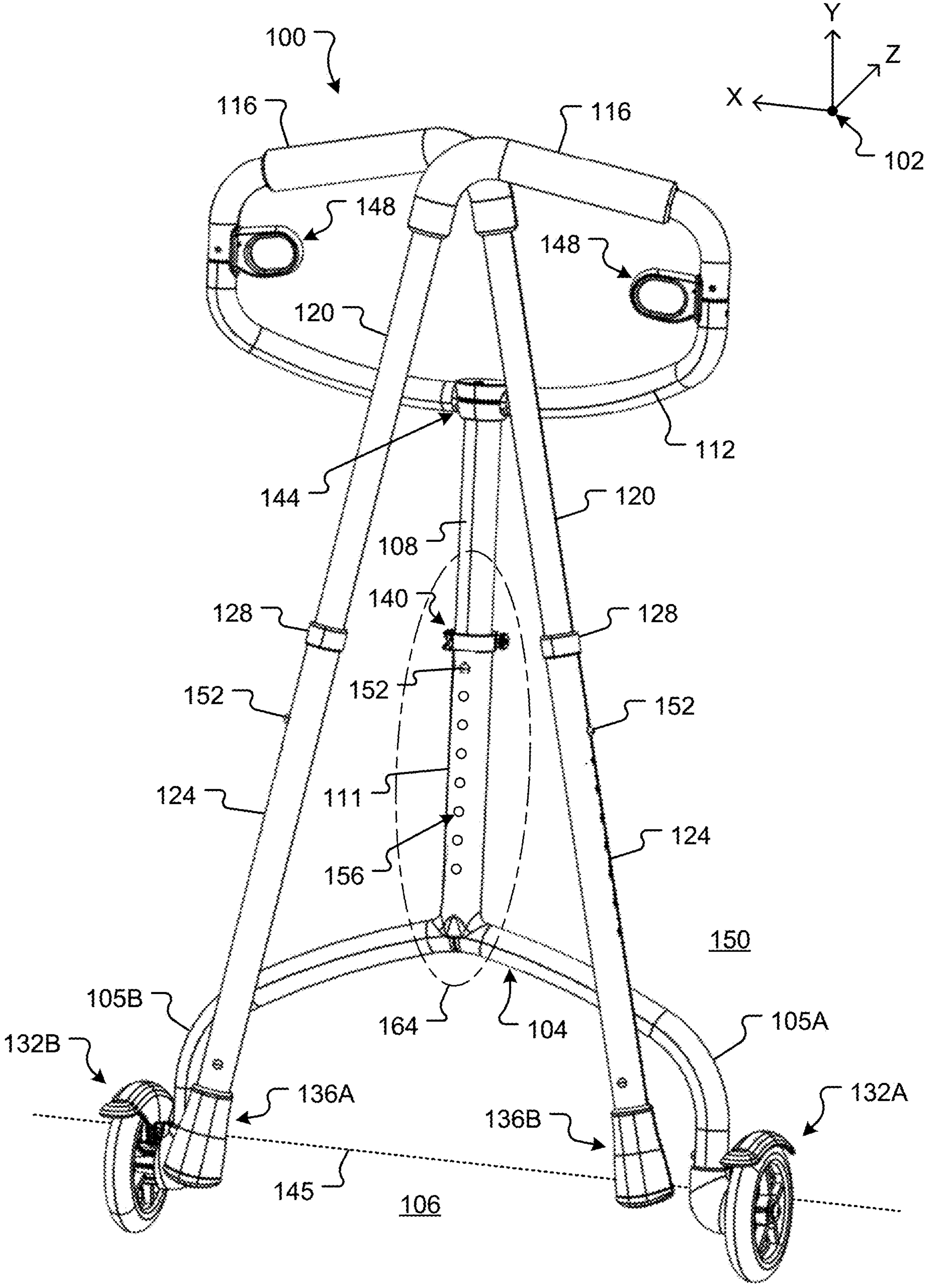
FIG. 1B is a perspective view of the walker in a folded state in accordance with examples of the present disclosure.

Referring to FIG. 1B, a perspective view of the walker 100 is shown in a folded state in accordance with examples of the present disclosure. When folded, the grip tube 120 and back leg 124 of a first side may rotate in a direction toward the center of the walker 100 and the grip tube 120 and back leg 124 of a second side may rotate in a direction toward the center of the walker 100 at least partially overlapping the other grip tube 120 and back leg 124 of the walker 100. In some examples, at least one set of the grip tubes 120 and back legs 124 of the walker 100 may lock in this folded state (e.g., via the fold-lock mechanism 148). In one example, the outermost grip tube 120 and back leg 124 of the walker 100 (e.g., overlapping the other grip tube 120 and back leg 124 of the walker 100) disposed furthest from the wishbone front support frame 104 may lock in the folded state containing the other grip tube 120 and back leg 124 of the walker 100 from moving. When in the folded state, the grip tube 120 previously disposed on the first side may be disposed adjacent the second side and the grip tube 120 previously disposed on the second side may be disposed adjacent the first side. In the folded state, both the grip tubes 120 may be adjacent the front plane.

In FIG. 1B, the front height adjustment holes 156 of the center front column 111 of the wishbone front support frame 104 are shown running an axial length of the center front column 111. In some examples, the front height adjustment holes 156 may be spaced apart at approximately 1 inch increments. In one example, the front height adjustment holes 156 may be spaced apart at approximately 0.5 inch increments. Among other things, the spacing of the holes in the front height adjustment holes 156 may provide increased variability in adjustments to the height of the walker 100. As illustrated in FIG. 1B, the locking pin 152 of the inner front column 108 is engaged with the uppermost hole in the front height adjustment holes 156 of the wishbone front support frame 104. In this position, the front height of the walker 100 is at the highest setting.

As provided above, when the walker 100 is in the folded state shown in FIG. 1B, the walker 100 may be easily carried, or moved, by gripping the walker 100 in the carry area 164. The carry area 164 may include the center of gravity of the walker 100. The carry area 164 is disposed at the center of the width of the walker 100. As provided above, when a first back leg 120 is arranged adjacent the second side, and a second back leg 120 is arranged adjacent the first side in the folded state, the carry area 164 of the center front column 111 is disposed between the first back leg 120 and the second back leg 120. The carry area 164 of the center front column 111 is unobstructed from the front side 130 of the walker 100 and the rear side 135 of the walker 100. In some examples, the vertical center of the carry area 164 may define the actual center of gravity of the walker 100. As can be appreciated, grasping the walker 100 in the carry area 164 (e.g., at the actual center of gravity) allows the walker 100 to be moved, and balanced, without exerting stress or uneven forces on the joints of a user while holding the walker 100.

The walker 100 shown in FIG. 1B is shown in a folded state and leaning against a wall 150. As illustrated in FIG. 1B, the floor 106 may run in the XZ-plane and the wall 150 may run in the XY-plane. The floor 106 and the wall 150 may intersect at an edge 145. In the folded state, the walker 100 takes up less than half the depth (e.g., measured along the Z-axis) than when in the open, or opened, state shown in FIG. 1A. The folded state allows the walker 100 to be transported, packed, or safely stowed in a compact space. Among other things, this folding ability is beneficial to users who wish to travel with the walker 100 and because of the ability to quickly collapse (e.g., fold) the walker 100 from an open state, users will be apt to use the walker 100 more often. In FIG. 1B, the front attachments 132A-132B may be locked into a nonrotating position preventing the walker 100 from sliding away from the wall 150. In one example, the front attachments 132A-132B, when configured as wheel assemblies 300, may have a brake engaged on at least one of the wheel assemblies 300 that prevents rolling of the walker 100.

Figure 1C:
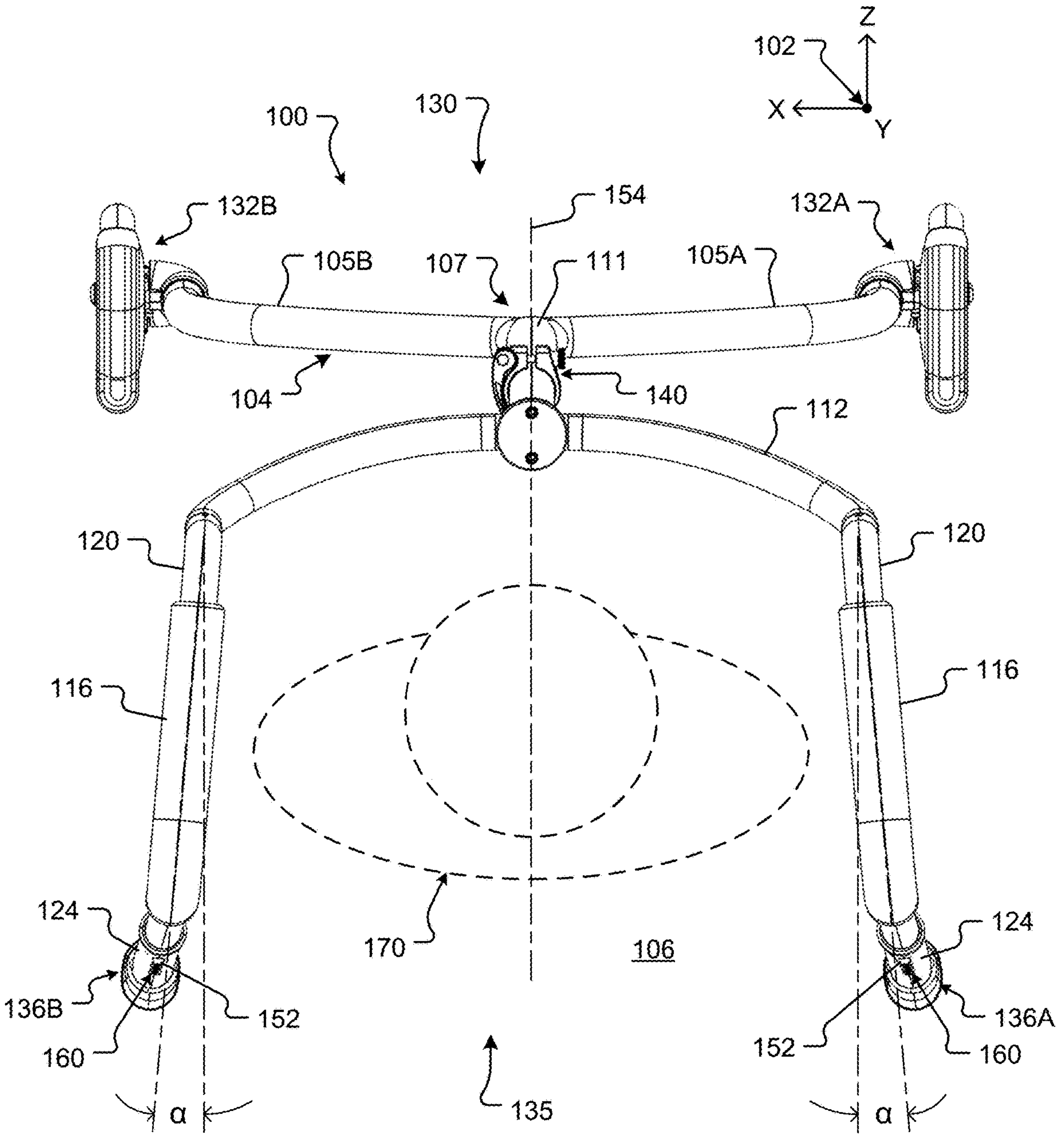
FIG. 1C is a top plan view of the walker in the open state in accordance with examples of the present disclosure.

FIG. 1C shows a top plan view of the walker 100 in the open state in accordance with examples of the present disclosure. FIG. 1C shows an interior user space 170 defining an area, or space, where a user may be positioned while using the walker 100. For instance, the user may be facing the center front column 111, while being positioned between the grip tubes 120. The walker 100 aims to position the user closer to the front side 130 of the walker 100 than conventional walking frames. This closer position provides enhanced stability and balance for the user over conventional walking frames where the front of the conventional walking frame is disposed further in front of and apart from the user. In addition to showing the interior user space 170, the plan view of FIG. 1C, shows the angle of the grip sleeves 116 and grip tubes 120 defining the handrail portions of the walker 100 relative to one another. In some examples, rather than being parallel to one another, the grip tube 120 and back leg 124 of one side of the walker 100 may be disposed at an angle relative to the grip tube 120 and back leg 124 of the other (e.g., opposite) side of the walker 100. For instance, each grip tube 120 and back leg 124 of the walker 100 may be angled outwardly from the center of the walker 100 (e.g., the interior user space 170) running from the front side 130 to the rear side 135 of the walker 100. Stated another way, the width dimension between opposing grip tubes 120 and back legs 124 adjacent to the front side 130 of the walker 100 may be less than the width dimension between the opposing grip tubes 120 and back legs 124 adjacent to the rear side 135 of the walker 100. The grip tube 120 and back leg 124 of each side may be rotated outwardly at the rear side 135 of the walker 100 from the parallel position by a flare angle, a. This flare angle, a, may closely match the natural position of the hands of a user when moving the walker 100 providing an ergonomic interface between the user and the walker 100. The center of the walker 100 may be defined by a centerline 154 running through the walker 100 in the Z-axis direction. In some examples, the centerline 154 may define a center plane running through the wishbone front support frame 104 along the YZ-plane. In some examples, one or more of the components making up the walker 100 may be symmetrical about the centerline 154. In one example, the first side of the walker 100 may be a mirror image of the second side of the walker 100 about the centerline 154.

Figure 1D:
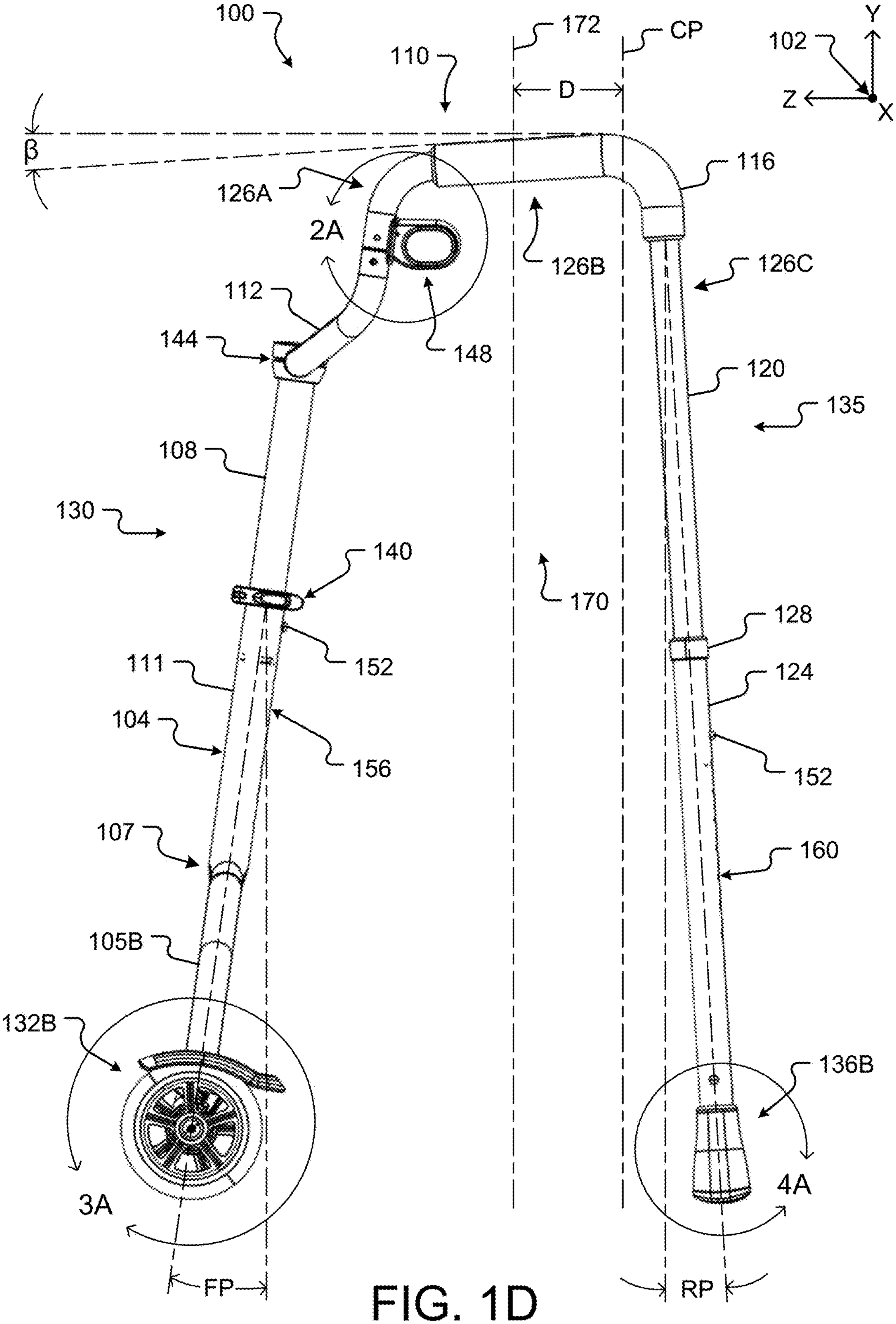
FIG. 1D is a side elevation view of the walker in accordance with examples of the present disclosure.

Referring now to FIG. 1D, a side elevation view of the walker 100 is shown in accordance with examples of the present disclosure. As described above, the walker 100 may provide one or more ergonomic interface regions for the user to contact. For instance, the handrail portion of the walker 100 (e.g., defined as the support rail section 126B of the grip tube 120), may be inclined, or angled, such that the handrail portion slopes from the rear side 135 of the walker 100 downward toward the front side 130 of the walker 100. Each of the handrail portions (e.g., of the sides of the walker 100) may be arranged in a same, or common, plane. This inclined plane may be angled such that a height dimension (e.g., measured along the Y-axis from a reference point on the walker 100 or the floor 106) at the front side 130 of the walker 100 is shorter than a height dimension (e.g., measured along the Y-axis from the reference point on the walker 100 or the floor 106) at the rear side 135 of the walker 100. Stated another way, the common plane may angle from a first height dimension measured at the front side 130 of the walker 100 to a higher second height dimension measured at the rear side 135 of the walker 100. In some examples, this pitch angle, β, may position a user closer to the front side 130 of the walker 100 than conventional walking frames having no angle or a reverse angle than that shown in FIG. 1D. In some examples, the pitch angle, β, may correspond to a downward angle between and including 2 degrees to 5 degrees running in a direction from the rear side 135 of the walker 100 toward the front side 130 of the walker 100. In one example, the pitch angle, β, may correspond to a 2 degree downward angle running in a direction from the rear side 135 of the walker 100 toward the front side 130 of the walker 100. In another example, the pitch angle, β, may correspond to a 5 degree downward angle running in a direction from the rear side 135 of the walker 100 toward the front side 130 of the walker 100. In any event, pitching the handrail portion of the walker 100 forward, as illustrated in FIG. 1D moves a user from a conventional walker position, CP, to a user center position 172 by a distance, D. This positional difference provides enhanced stability of the user relative to conventional walking frames having a zero angle (e.g., parallel), or a reverse angle (e.g., angling downward from the front to the rear of the walker 100), pitched handrail portion. The downward angle may correspond to an angle measured from a horizontal reference plane that is arranged parallel to the floor 106.

In addition to positioning the user in a center forward position in the frame of the walker 100 during use, the pitch angle, β, of the handrail portions provide an ergonomic interface between the user and the walker 100 that reduces stress on the user, enhances the user's gait, and provides a safer operation of the walker 100 during use.

In some examples, the wishbone front support frame 104 may be pitched at a front pitch angle, FP, such that the stem 144 of the walker 100 is closer to the interior user space 170 than the front attachments 132A-132B. Additionally or alternatively, the grip tubes 120 and back legs 124 may be pitched at a rear pitch angle, RP, such that the upper portion of the grip tube 120 (e.g., between the grip sleeve 116 and the back leg 124) is disposed closer to the interior user space 170 than the rear attachments 136A-136B. These pitched components of the frame of the walker 100 may provide additional stability by, among other things, providing a broader base contact (e.g., with the floor 106, etc.) for the walker 100 than if running vertically (e.g., along the Y-axis).

In some examples, when the user is in contact with the grip sleeves 116 of the walker 100, the fold-lock mechanism 148 may be within reach of the user. In particular, the user may be able to maintain a grip on the grip sleeves 116 while actuating the fold-lock mechanism 148 as described in conjunction with FIGS. 2A-2G.

Figure 2A:
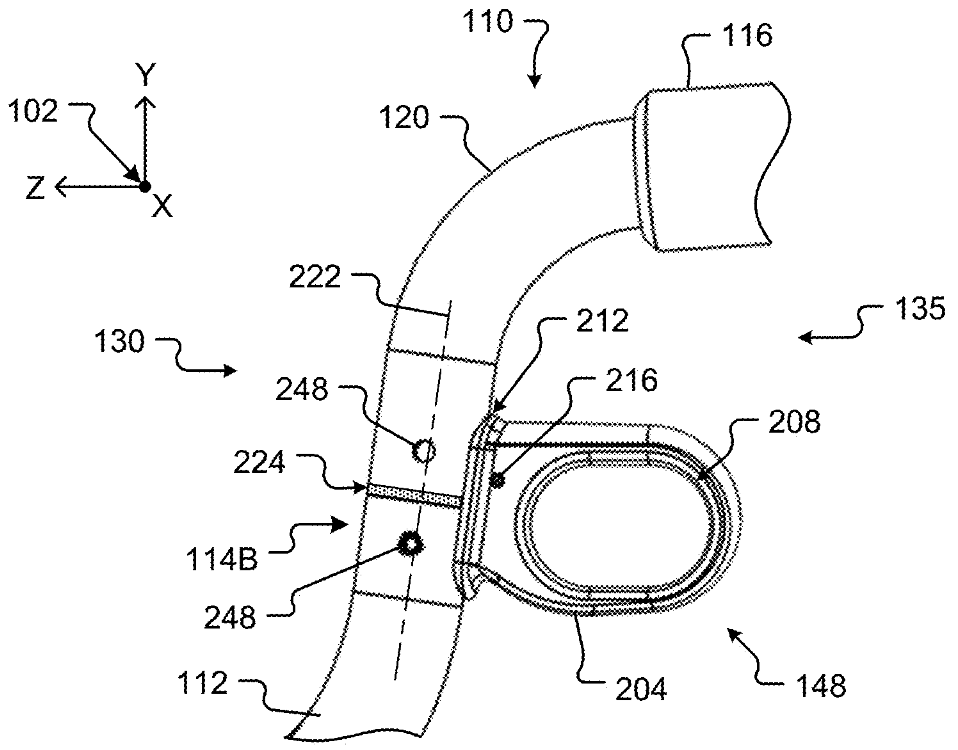
FIG. 2A is a detail side elevation view of a walker fold-lock mechanism in an unactuated state taken from circle 2A of FIG. 1D in accordance with examples of the present disclosure.

FIG. 2A is a detail side elevation view of a walker fold-lock mechanism 148 in an unactuated state taken from circle 2A of FIG. 1D in accordance with examples of the present disclosure. The fold-lock mechanism 148 is shown in particular configurations (or shown to have a particular shape/design), but it should be appreciated that this is one of many possible configurations/shapes/designs. The fold-lock mechanism 148 may comprise a trigger body 204 having a ring pull 208 and a shroud 212 portion. The fold-lock mechanism 148 may be attached to the grip tube 120 of the walker 100 arranged to slide at least along an outer diameter of the grip tube 120 and/or the handlebar 112. For instance, the fold-lock mechanism 148 may comprise locking elements that are disposed inside the grip tube 120 and inside the handlebar 112. The trigger body 204 may be attached to at least one of these components via a trigger fastener 216 (e.g., a dowel pin, spring pin, screw, etc.). The fold-lock mechanism 148 may include a lock receiver body 224 that is rotationally fixed to the handlebar 112 by at least one mount fastener 248. The lock receiver body 224 may comprise a portion that is disposed in the second tube end 114B. These locking elements are concealed within the frame components of the walker 100. Among other things, disposing the locking elements of the fold-lock mechanism 148 inside the grip tube 120 and the handlebar 112 provides safe operation (e.g., preventing contact by a user or objects during use, etc.), a clean appearance, and prevents exposure of the locking elements to the environment. In some examples, the trigger body 204 may be spring-biased (e.g., via a compression spring, etc.) downward in an unactuated, or locked, position as shown in FIG. 2A.

Figure 2B:
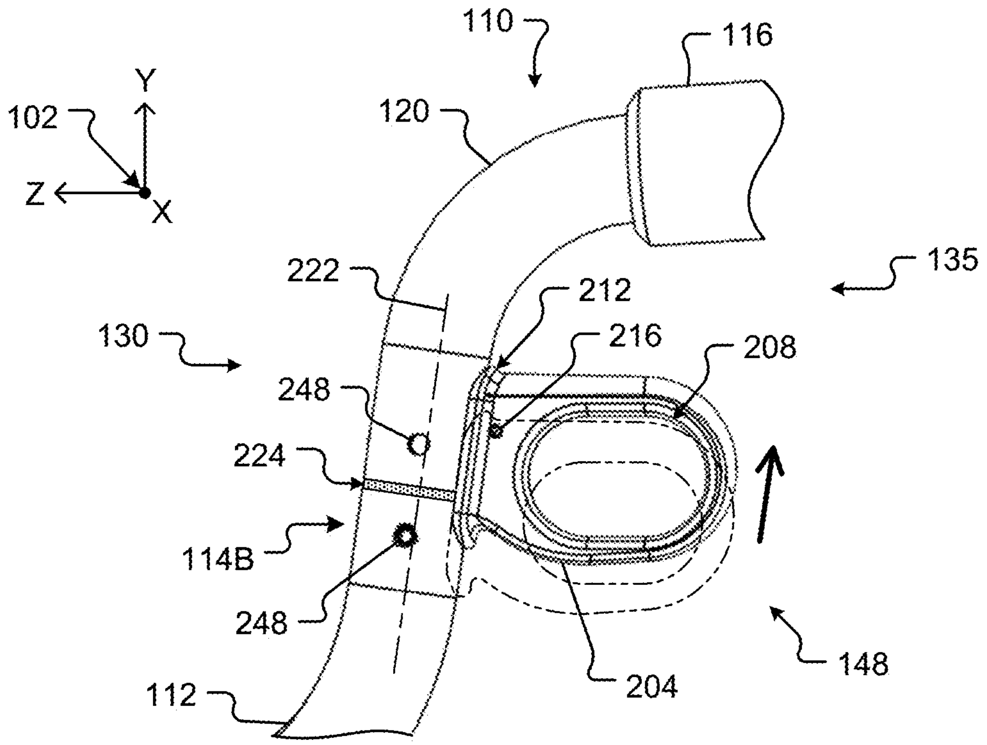
FIG. 2B is a detail side elevation view of the walker fold-lock mechanism of FIG. 2A in an actuated state.

As illustrated in FIG. 2B, a user may actuate the fold-lock mechanism 148 by pulling the ring pull 208 of the trigger body 204 upwardly (e.g., in the Y-axis direction) closer to the grip sleeve 116. As the ring pull 208 is actuated, the trigger body 204 may translate, or slide, linearly along the outer diameter of the grip tube 120. In this position, the fold-lock mechanism 148 may unlock a rotational locking between the handlebar 112 and the grip tube 120. For instance, when the fold-lock mechanism 148 is actuated and the rotation is unlocked, the grip tube 120 may be allowed to rotate about the folding axis 222 relative to the handlebar 112. Conversely, when in the unactuated, or locked, state shown in FIG. 2A, the grip tube 120 may be prevented from rotating about the folding axis 222 relative to the handlebar 112. The original unactuated position of the trigger body 204 is shown in FIG. 2B in phantom lines.

Figure 2C:
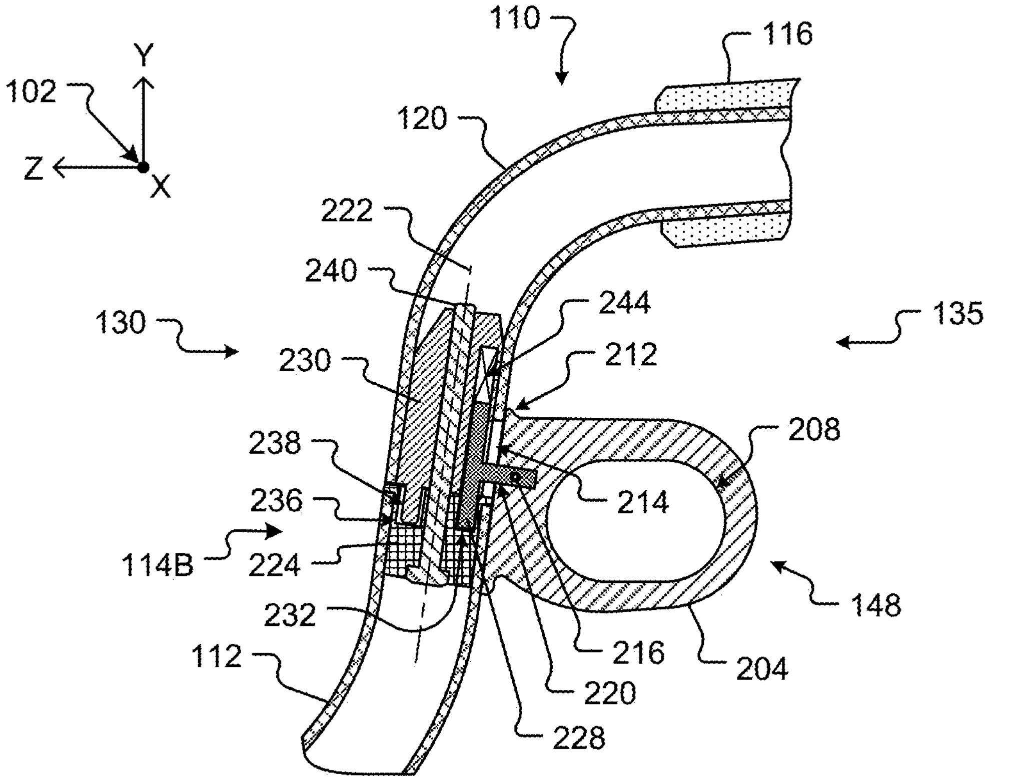
FIG. 2C is a detail section view of the walker fold-lock mechanism in an unactuated state taken through an axial center of the handlebar at a tube end thereof in accordance with examples of the present disclosure.
Figure 2D:
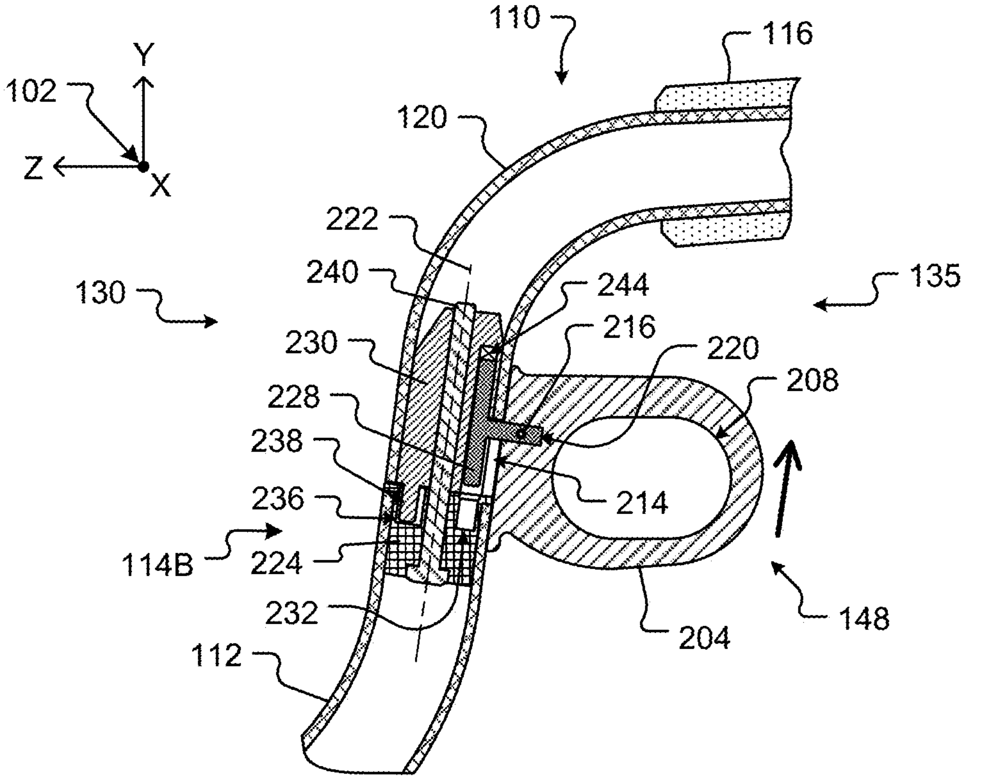
FIG. 2D is a detail section view of the walker fold-lock mechanism in an actuated state taken through an axial center of the handlebar at a tube end thereof in accordance with examples of the present disclosure.

Referring to FIGS. 2C and 2D, detail section views of the fold-lock mechanism 148 are shown taken through the rotation axis 222 in the YZ-plane. FIG. 2C corresponds to a detail section view of the fold-lock mechanism 148 in the unactuated state shown in FIG. 2A, and FIG. 2D corresponds to a detail section view of the fold-lock mechanism 148 in the actuated state shown in FIG. 2B.

The fold-lock mechanism 148 may comprise a lock receiver body 224, an internal lock housing 230, and a locking pin 228. The internal lock housing 230 may be rotationally fixed relative to the grip tube 120 (e.g., via at least one mount fastener 248). A housing portion of the internal lock housing 230 may be disposed inside an end of the grip tube 120 adjacent the second tube end 114B of the handlebar 112. The lock receiver body 224 may be disposed at least partially inside the second tube end 114B of the handlebar 112, and the lock receiver body 224 may be rotationally fixed relative to the handlebar 112 (e.g., via at least one mount fastener 248). However, the grip tube 120 and the internal lock housing 230 may rotate together relative to the handlebar 112 and the lock receiver body 224, when the fold-lock mechanism 148 is in an unlocked, or actuated, state as shown in FIGS. 2B and 2D.

In some examples, a locking pin 228 may be slidably disposed in a portion (e.g., receptacle, chamber, etc.) of the internal lock housing 230. The locking pin 228 may comprise a tang 220 that extends in a radial direction through a slot 214 in the end of the grip tube 120 (e.g., handrail portion) adjacent the second tube end 114B of the handlebar 112. The shroud 212 may conceal the slot 214 when in an actuated state and when in an unactuated state of the fold-lock mechanism 148. As shown, the shroud 212 may wrap around a portion of the trigger body 204 and extend along a length of the grip tube 120 and/or handlebar 112. The tang 220 may be fixed in the trigger body 204 (e.g., via a trigger fastener 216). In one example, the tang 220 may be keyed to the trigger body 204. In any event, an actuation movement of the trigger body 204 in a slide direction (e.g., indicated by the arrows in FIGS. 2B and 2D) moves the tang 220 and the locking pin 228 in the slide direction. As the locking pin 228 moves inside the internal lock housing 230 a spring 244 (e.g., compression spring, etc.) may provide an axial force between the internal lock housing 230 acting against the locking pin 228. The spring 244 is shown in an extended state in FIG. 2C and a compressed state in FIG. 2D. When actuated in this manner, the locking pin 228 is disengaged from a first locking receptacle 232 disposed in the lock receiver body 224 allowing the grip tube 120 to rotate relative to the handlebar 112 about the rotation axis 222.

A rotation limit pin 238 may be disposed in the internal lock housing 230 and extend into a rotation limit slot 236 disposed in the lock receiver body 224. The rotation limit pin 238 and rotation limit slot 236 may prevent the grip tube 120 from rotating beyond predefined limits (e.g., between the open and the folded state positions). The internal lock housing 230 and the lock receiver body 224 may be attached to one another via a main bolt 240. The main bolt 240 may be coaxial with the rotation axis 222 and allow rotation between the internal lock housing 230 and the lock receiver body 224 while maintaining an axial connection between the two components.

Figure 2E:
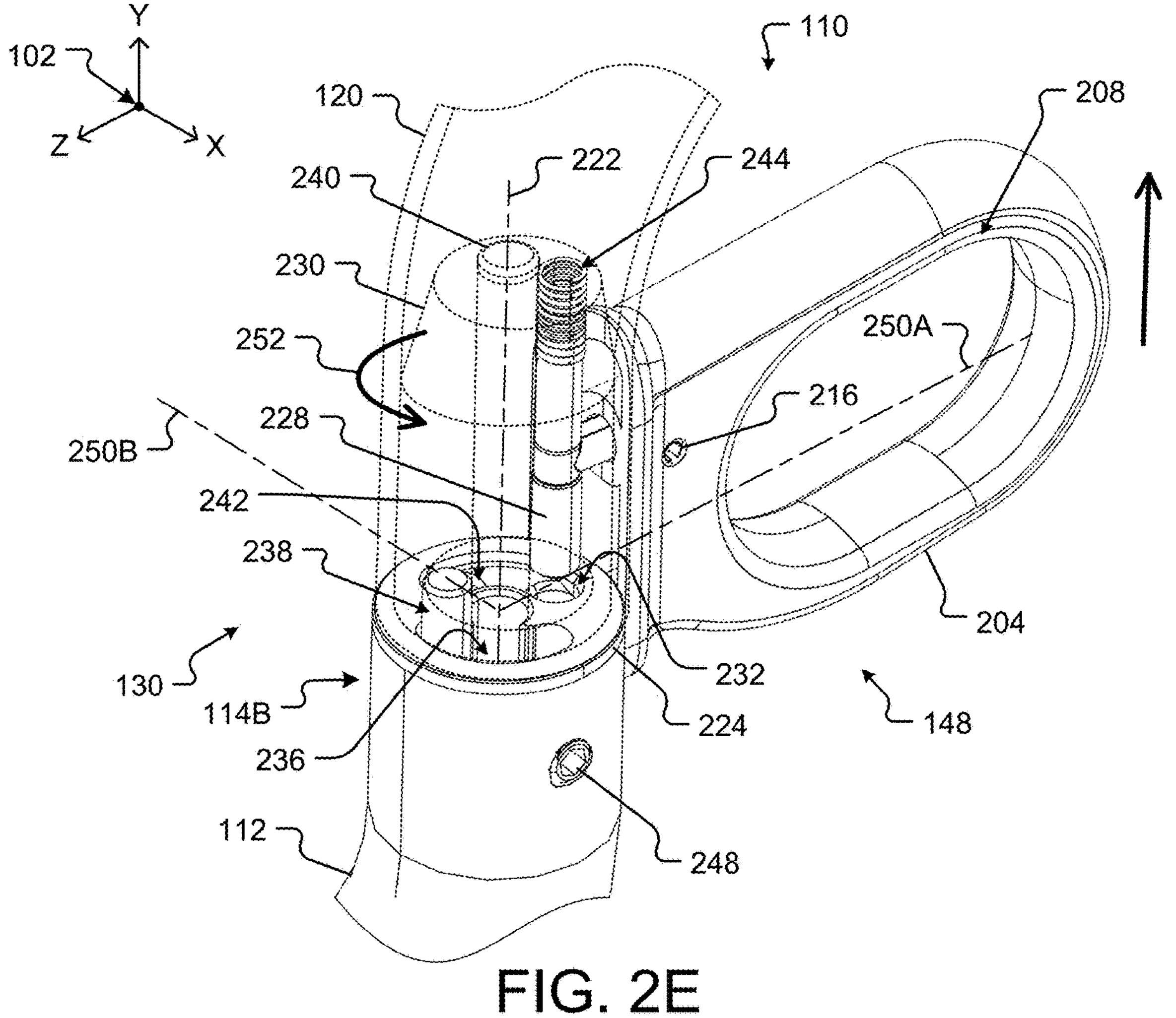
FIG. 2E is a detail perspective view of the walker fold-lock mechanism in an actuated state in accordance with examples of the present disclosure.
Figure 2F:
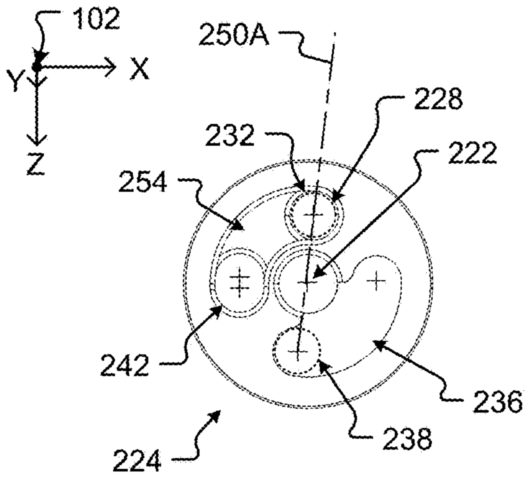
FIG. 2F is a schematic plan view of the lock receiver body relative to other portions of the walker fold-lock mechanism in an open position of the walker in accordance with examples of the present disclosure.
Figure 2G:
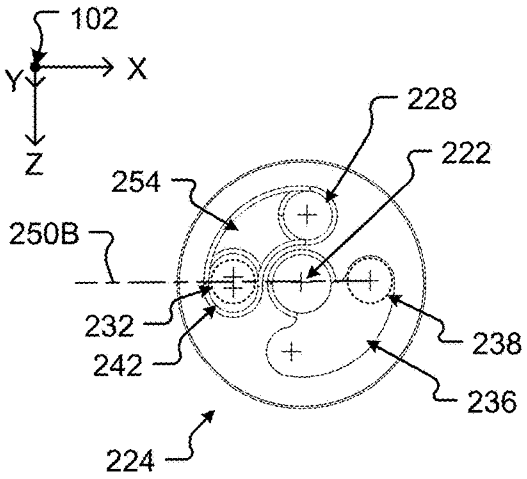
FIG. 2G is a schematic plan view of the lock receiver body relative to other portions of the walker fold-lock mechanism in a folded position of the walker in accordance with examples of the present disclosure.

A detail perspective view of the fold-lock mechanism 148 in an actuated state is shown in FIG. 2E. The grip tube 120, the internal lock housing 230, and other portions of the walker 100 are shown in dashed lines for the sake of clarity in disclosure and illustrate the locking elements of the fold-lock mechanism 148. FIGS. 2F and 2G show the positions of the locking pin 228 and the first locking receptacle 232 relative to the features of the lock receiver body 224. Specifically, FIG. 2F shows when the grip tube 120 is in an open position, corresponding to the opened position angle line 250A shown in FIG. 2E, and FIG. 2G shows when the grip tube 120 is in a folded position, corresponding to the folding position angle line 250B shown in FIG. 2E.

As provided above, when the walker 100 is in an opened state and the trigger body 204 is actuated (e.g., pulled toward the support rail section 126B of the grip tube 120), the locking pin 228 is removed, or disengaged, from the first locking receptacle 232 while the grip tube 120 and the trigger body 204 lie in a plane running through the opened position angle line 250A along the Y-axis. This position corresponds to the position of the locking pin 228 relative to the first locking receptacle 232 and the rotation limit pin 238 relative to the rotation limit slot 236 of the lock receiver body 224 shown in FIG. 2F. When the locking pin 228 is engaged with, or inserted into, the first locking receptacle 232 or the second locking receptacle 242, the grip tube 120 is rotationally fixed, or locked, relative to the handlebar 112. However, when the locking pin 228 is disengaged from the first locking receptacle 232 or the second locking receptacle 242, the grip tube 120 is free to rotate between the positions of the first locking receptacle 232 and the second locking receptacle 242. Once actuated, the grip tube 120 may be rotated in the handrail folding direction 252 (e.g., toward the centerline 154 of the walker 100). In one example, the lock receiver body 224 may comprise a transition slide groove 254 having a surface that sits lower than a top of the lock receiver body 224 and higher than the bottom of the first locking receptacle 232. In this example, when the locking pin 228 is disposed above the transition slide groove 254, the user may release the trigger body 204 allowing the locking pin 228 to contact the transition slide groove 254. As the grip tube 120 continues to be rotated in the handrail folding direction 252, the locking pin 228 slides along the transition slide groove 254 until the locking pin 228 reaches the second locking receptacle 242 disposed in the lock receiver body 224. In some examples, the lock receiver body 224 may be configured as a hole or a slot. When the locking pin 228 axially aligns with the second locking receptacle 242, the spring 244 may force the locking pin 228 into the second locking receptacle 242 (e.g., as shown in FIG. 2G), locking the grip tube 120 in the folded state. When the walker 100 is in the folded state and the grip tube 120 and the trigger body 204 lie in a plane running through the folding position angle line 250B along the Y-axis. This folded position corresponds to the position of the locking pin 228 relative to the second locking receptacle 242 and the rotation limit pin 238 relative to the rotation limit slot 236 of the lock receiver body 224 shown in FIG. 2G. In some examples, one or more of the first locking receptacle 232, the second locking receptacle 242, and the transition slide groove 254 may comprise chamfered, radiused, or tapered edges to guide the locking pin 228. As shown in FIG. 2F, the rotation limit pin 238 in a first position of the rotation limit slot 236 may prevent rotation of the grip tube 120 relative to the handlebar 112 in a clockwise direction about the rotation axis 222 past the opened position angle line 250A. In FIG. 2G, the rotation limit pin 238 in a second position of the rotation limit slot 236 may prevent rotation of the grip tube 120 relative to the handlebar 112 in a counterclockwise direction about the rotation axis 222 past the folding position angle line 250B. In some examples, the angle measured between the opened position angle line 250A and the folding position angle line 250B may be about 90 degrees, plus or minus 10 degrees.

Moving back to the open state from the folded state may include performing the above steps in reverse order. For instance, the fold-lock mechanism 148 may be actuated from the folded state (e.g., allowing rotation of the grip tube 120 relative to the handlebar 112), the grip tube 120 may then be freely rotated into the open state where the lock protrusion 228 engages with the first locking receptacle 232 locking the grip tube 120 relative to the handlebar 112. More specifically, when in the folded state, the trigger body 204 may be actuated (e.g., pulled toward the support rail section 126B of the grip tube 120), to disengage the locking pin 228 from the second locking receptacle 242 while the grip tube 120 and the trigger body 204 lie in the plane running through the folding position angle line 250B along the Y-axis unlocking the rotation of the grip tube 120 relative to the handlebar 112. To open the walker 100, the user may then rotate the grip tube 120 relative to the handlebar 112 in a direction opposite the handrail folding direction 252 until the locking pin 228 aligns with the first locking receptacle 232 and the trigger body 204 is released allowing the locking pin 228 to insert into the first locking receptacle 232 locking the grip tube 120 with the handlebar 112 and preventing rotation.

While FIGS. 2A-2G show the fold-lock mechanism 148 of the second side of the walker 100, the same, or similar, components and movements may apply to the first side of the walker 100. However, the lock receiver body 224 of the first side of the walker 100 may correspond to a mirror image of the lock receiver body 224 of the second side of the walker 100 (e.g., taken through the centerline 154 of the walker 100). This mirroring of the rotation limit slot 236, the first locking receptacle 232, and the second locking receptacle 242 allows the grip tube 120 on the first side of the walker 100 to rotate inward toward the centerline 154 of the walker 100.

FIGS. 3A-3D show various views of a wheel assembly 300 option for the front attachments 132A-132B of the walker 100. The wheel assembly 300 may comprise a wheel 304 (e.g., that rotates about a wheel rotation axis 302), and a fender 308 having a fender body 312 that is capable of rotating about a fender rotation axis 306 when a force is applied to the step ledge 316. When the fender 308 is rotated about the fender rotation axis 306, a brake foot 320 may engage with one or more brake foot recesses 324 disposed around a hub of the wheel 304.

Figure 3B:
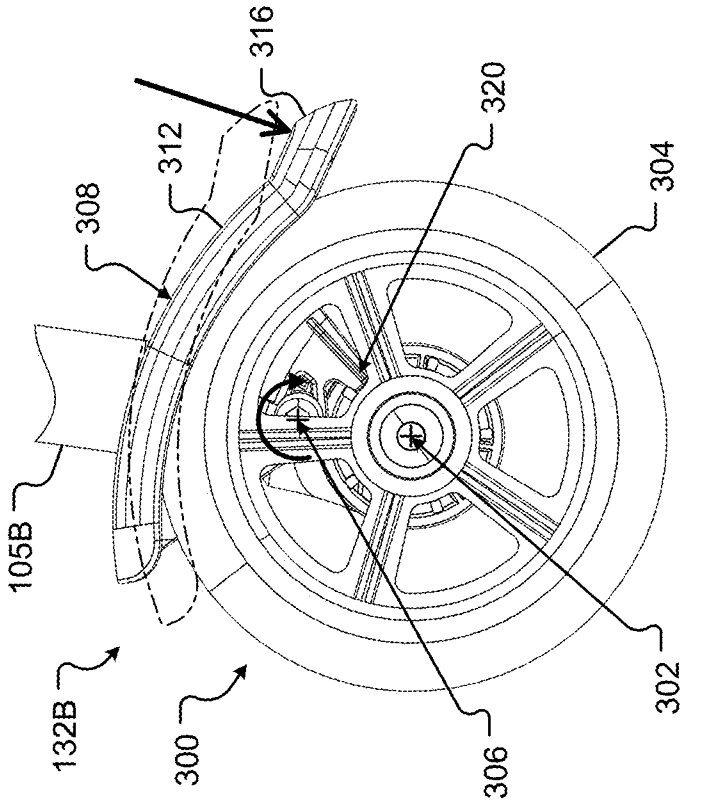
FIG. 3B is a detail side elevation view of the wheel assembly of FIG. 3A in a locked state.
Figure 3A:
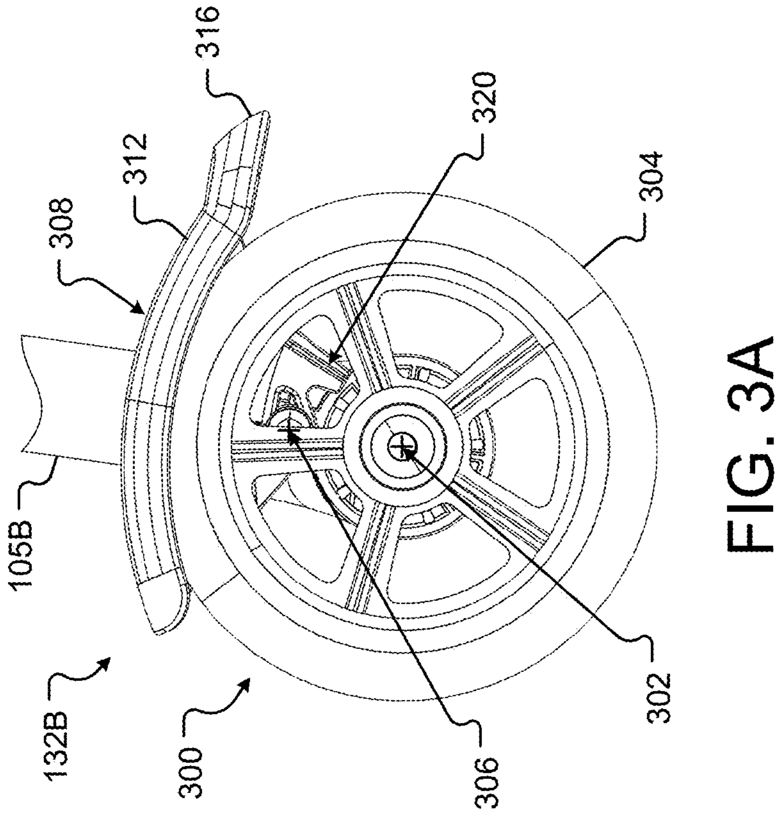
FIG. 3A is a detail side elevation view of a wheel assembly in an unlocked state taken from circle 3A of FIG. 1D in accordance with examples of the present disclosure.
Figure 3D:
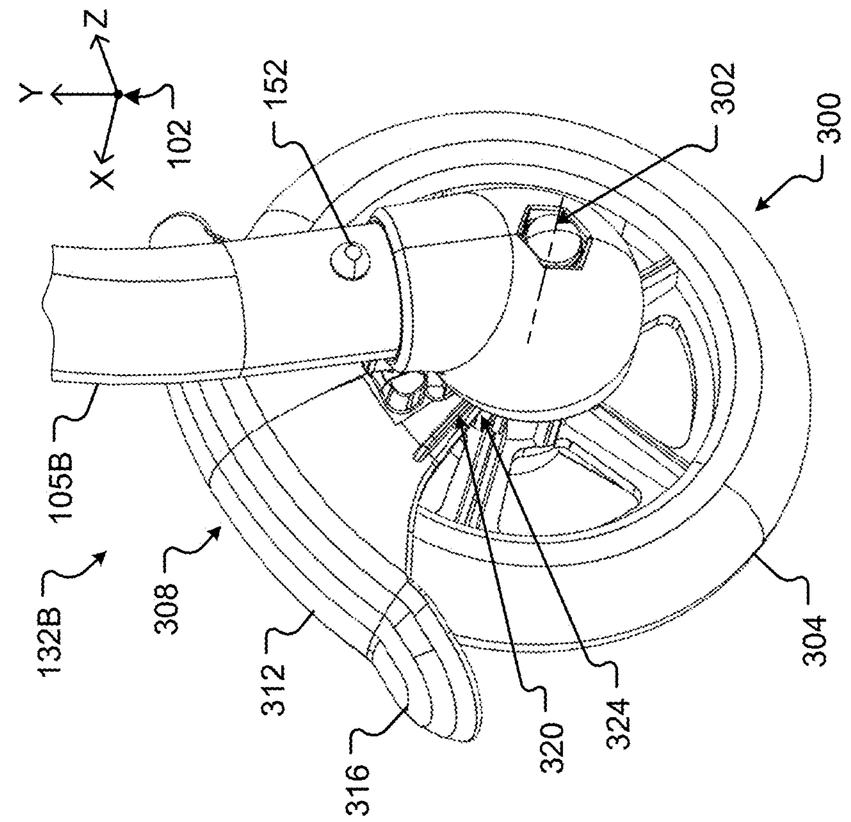
FIG. 3D is a detail inside perspective view of the wheel assembly of FIG. 3B.
Figure 3C:
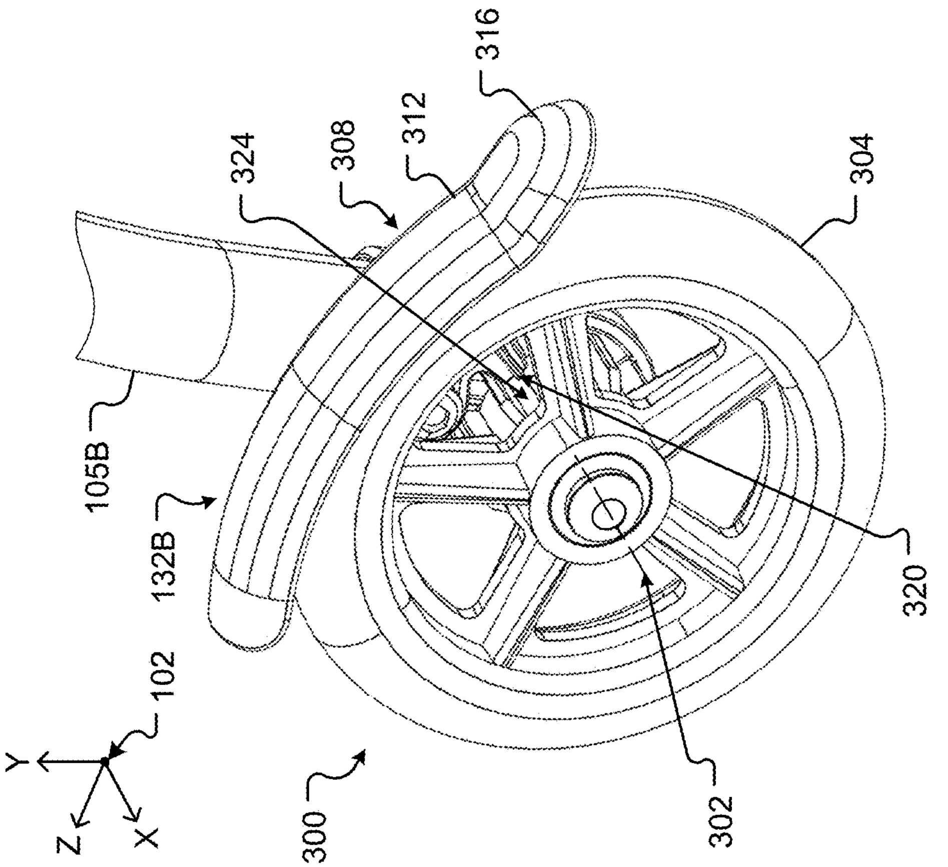
FIG. 3C is a detail outside perspective view of the wheel assembly of FIG. 3B.

For instance, FIG. 3B shows a force applied to the step ledge 316 of the fender 308 that rotates the fender body 312 about the fender rotation axis 306. When rotated, the brake foot 320 engages with the brake foot recess 324 in the hub of the wheel 304 (shown in FIG. 3C). The brake foot 320 may be configured as a protrusion that contacts sides of the brake foot recess 324 when engaged. In any event, when the brake is engaged by pivoting the fender 308 about the fender rotation axis 306, the contact between the brake foot 320 and the brake foot recess 324 prevents rotation of the wheel 304 about the wheel rotation axis 302. In some examples, the wheel assembly 300 may be released from the brake, or locked, position to a rotating position (e.g., allowing rotation of the wheel 304 about the wheel rotation axis 302), by applying a force opposite the force shown in FIG. 3B. For example, a user may lift the step ledge 316 of the fender 308 rotating the fender body 312 about the fender rotation axis 306 in the opposite direction and releasing, or disengaging, the brake foot 320 from the brake foot recess 324.

The ends of the front attachment legs 105A, 105B of the wishbone front support frame 104 may include tube ends, or connection ends 109A, 109B, that are configured to interchangeably receive the wheel assembly 300 or a foot assembly 400 as described in FIGS. 4A-4D. As shown in the perspective view of FIG. 3D, the wheel assembly 300 may insert at least partially into the end of the second attachment leg 105B and lock into place via at least one locking pin 152 engaging with a corresponding receptacle disposed in the second attachment leg 105B.

While FIGS. 3A-3D show the second front attachment 132B of the second side of the walker 100, the same, or similar, components may apply to the first side of the walker 100. However, the wheel assembly 300 of the first side of the walker 100 may correspond to a mirror image of the wheel assembly 300 of the second side of the walker 100 (e.g., taken through the centerline 154 of the walker 100). This mirroring allows the wheel 304 and the fender 308 of the wheel assembly 300 to be disposed on an outermost portion of the walker 100 on the first side of the walker 100.

FIGS. 4A-4D show various views of the foot assembly 400 of the walker 100 in accordance with examples of the present disclosure. As described above, the foot assembly 400 may be attached to the back legs 124 and/or the wishbone front support frame 104 (e.g., the front side 130) of the walker 100. For example, the foot assembly 400 may be attached to the first and second connection ends 109A, 109B of the first and second attachment legs 105A, 105B, respectively. Although described in conjunction with the rear attachments 136A-136B of the walker 100 it should be appreciated that the foot assembly 400 may be attached to any floor contacting portion of the walker 100 shown and described herein.

The foot assembly 400 comprises a shroud 404 and a glide cap 408 operatively attached to surround a grip foot 412 that attaches to the frame of the walker 100 (e.g., the tube ends of the front attachment legs and/or the back legs 124). The foot assembly 400 may be retained in the back leg 124 and/or other tube end of the walker 100 via at least one locking pin 452. The locking pin 452 may be the same as, or similar to, the locking pin 152 described above. The shroud 404 and the glide cap 408 may be spring-biased in a downward (e.g., floor facing) direction past a contact surface of the grip foot 412. In one example, the detail side elevation view of the foot assembly 400 of the walker 100 shown in FIG. 4A may define a default, or normal, "gliding" state of the foot assembly 400. In this position, the glide cap 408 may extend past a grip surface of the grip foot 412. When the walker 100 is lifted or dragged across a surface (e.g., the floor 106, etc.) the glide cap 408 (e.g., a gliding surface) contacts the surface and provides a low-friction interface between the walker 100 and the surface. In some examples, the glide cap 408 may be made from plastic, thermoplastic polyurethane, etc., and/or the like.

Figure 4B:
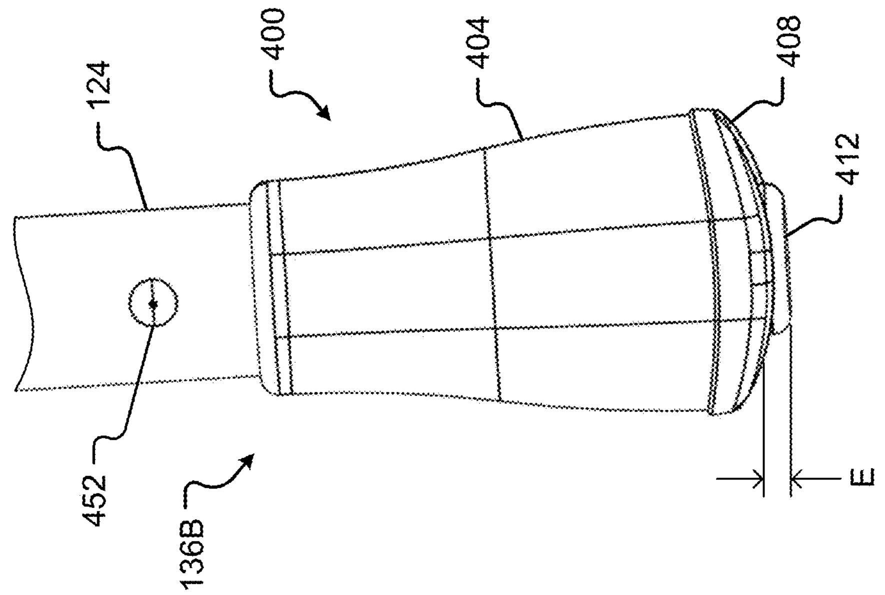
FIG. 4B is a detail side elevation view of the foot assembly of the walker in a contacting state in accordance with examples of the present disclosure.
Figure 4A:
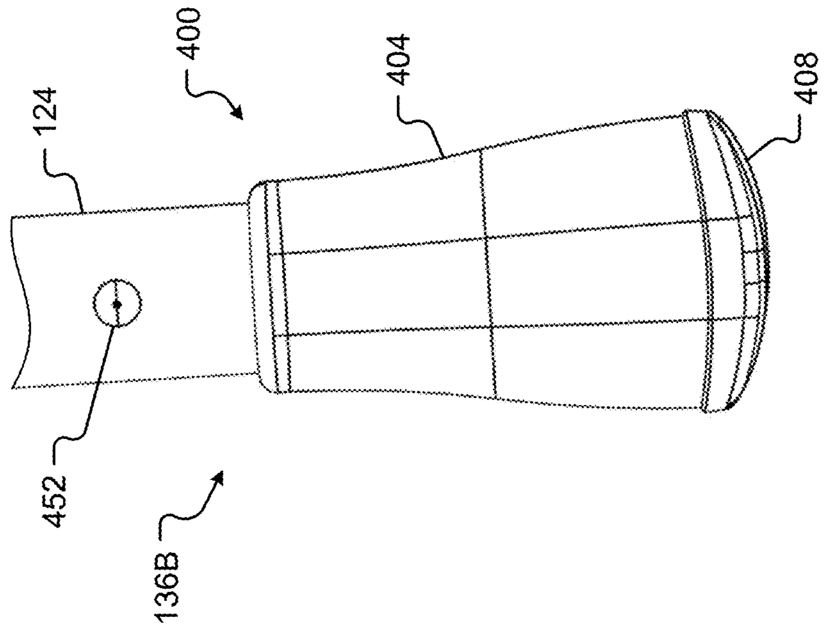
FIG. 4A is a detail side elevation view of the foot assembly of the walker in a gliding state taken from circle 4A of FIG. 1D in accordance with examples of the present disclosure.

When a user applies a predetermined downward force (e.g., toward the floor 106), or weight, to the walker 100, the grip foot 412 may extend some distance, E, past the end of the grip foot 412 and/or glide cap 408, as shown in FIG. 4B. In one example, the grip foot 412 may be arranged flush with a surface of the glide cap 408 when the downward force is applied. In any event, the grip foot 412 may extend into position contacting the surface (e.g., floor 106) providing a nonslip connection between the walker 100 and the surface.

Figure 4C:
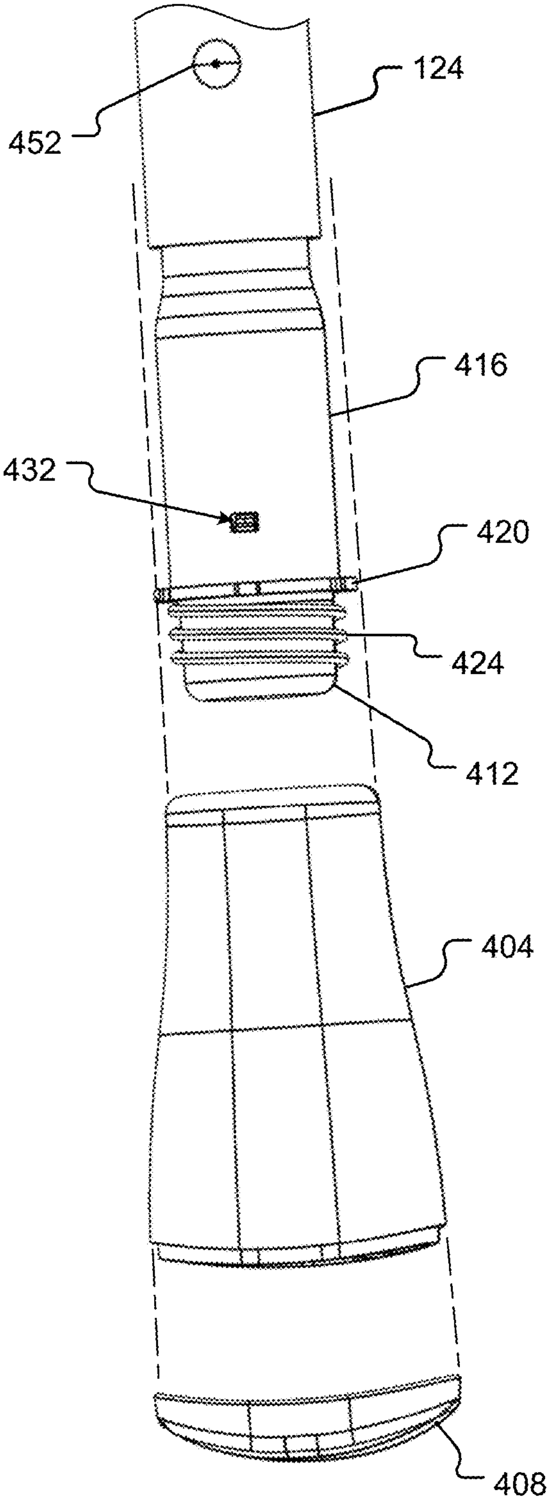
FIG. 4C is a first exploded perspective view of the foot assembly of the walker in accordance with examples of the present disclosure.

FIG. 4C is a first exploded perspective view of the foot assembly 400 of the walker 100 in accordance with examples of the present disclosure. As shown in FIG. 4C, the grip foot 412 may be disposed in a foot body 416 that inserts into a tube end of the walker 100 frame (e.g., a portion of the wishbone front support frame 104 and/or back legs 124). In one example, the foot body 416 may be swaged into the tube end of the back leg 124. In another example, the foot body 416 may be retained in the tube end by at least one locking pin 152. The foot assembly 400 may comprise a compression spring 424 that biases the shroud 404 and glide cap 408 in a direction away from the contact surface of the grip foot 412. The compression spring 424 may be inserted, or otherwise arranged, between a spring flange 420 and glide cap 408. The grip foot 412 and/or the spring flange 420 may be retained in the foot body 416 via at least one locking clip 432.

The glide cap 408 may be connected to the shroud 404 via one or more lock tabs or clips. The lock tabs or clips may engage with corresponding features disposed in an end of the shroud 404. In one example, the glide cap 408 may be replaced (e.g., due to wear) or exchanged by removing the glide cap 408 from the shroud 404 via the lock tab and slot interface. A user may select a particular glide cap 408 having a desired friction, width, color, shape, and/or the like.

Figure 4D:
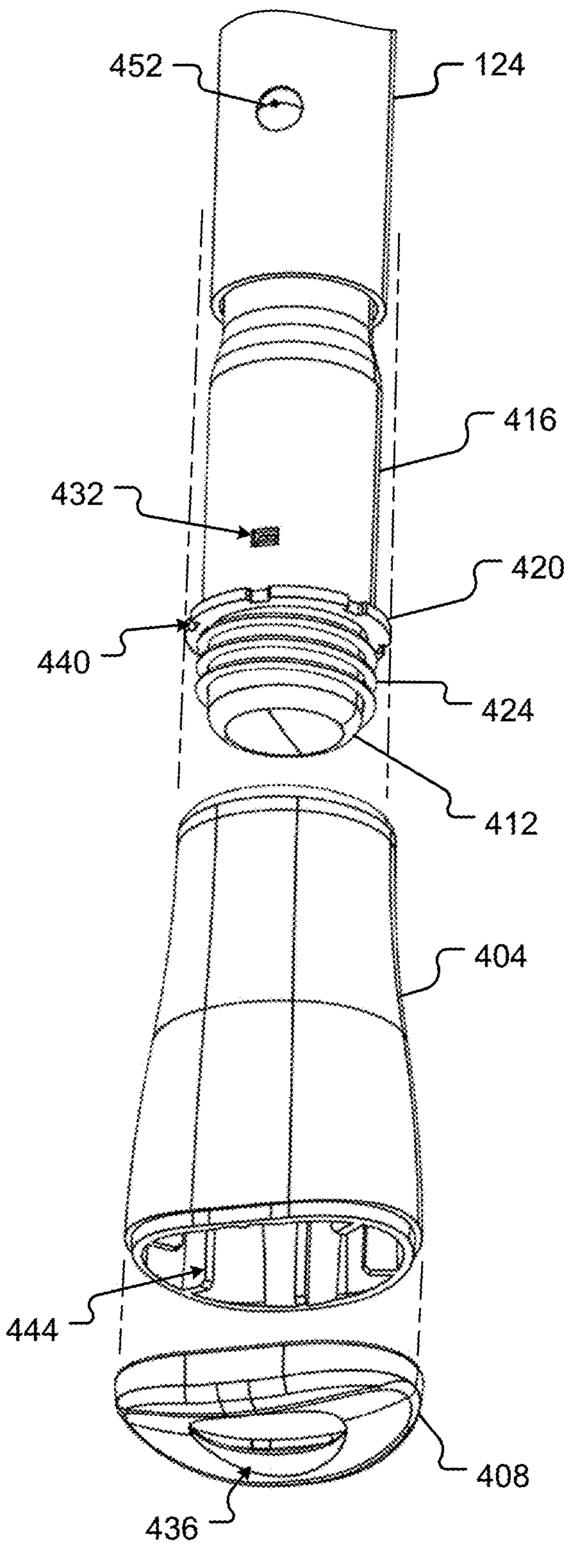
FIG. 4D is a second exploded perspective view of the foot assembly of the walker in accordance with examples of the present disclosure.

As shown in FIG. 4D, the glide cap 408 of the foot assembly 400 may comprise a foot aperture 436 through which the grip foot 412 may pass. Moreover, the glide cap 408 is shown to have complex geometry that allows for minimal surface contact between the glide cap 408 and, for example, a floor 106 when the glide cap 408 is biased past the grip foot 412. The geometry may include radiused surfaces and/or edges along the X-axis and the Y-axis. The foot body 416 may be rotationally keyed to the back leg 124 such that the radiused surfaces do not rotate relative to the back leg 124. For instance, the spring flange 420 may comprise one or more keyways 440 disposed around a periphery thereof. Mating key ribs 444, or keys, may be formed along an inside of the grip foot 412. As the key ribs 444 engage with the keyways 440 in the spring flange 420, the grip foot 412 may be allowed to move along the axis of the back leg 124 but not rotate about the axis of the back leg 124.

Figures 5A, 5B, 5C:
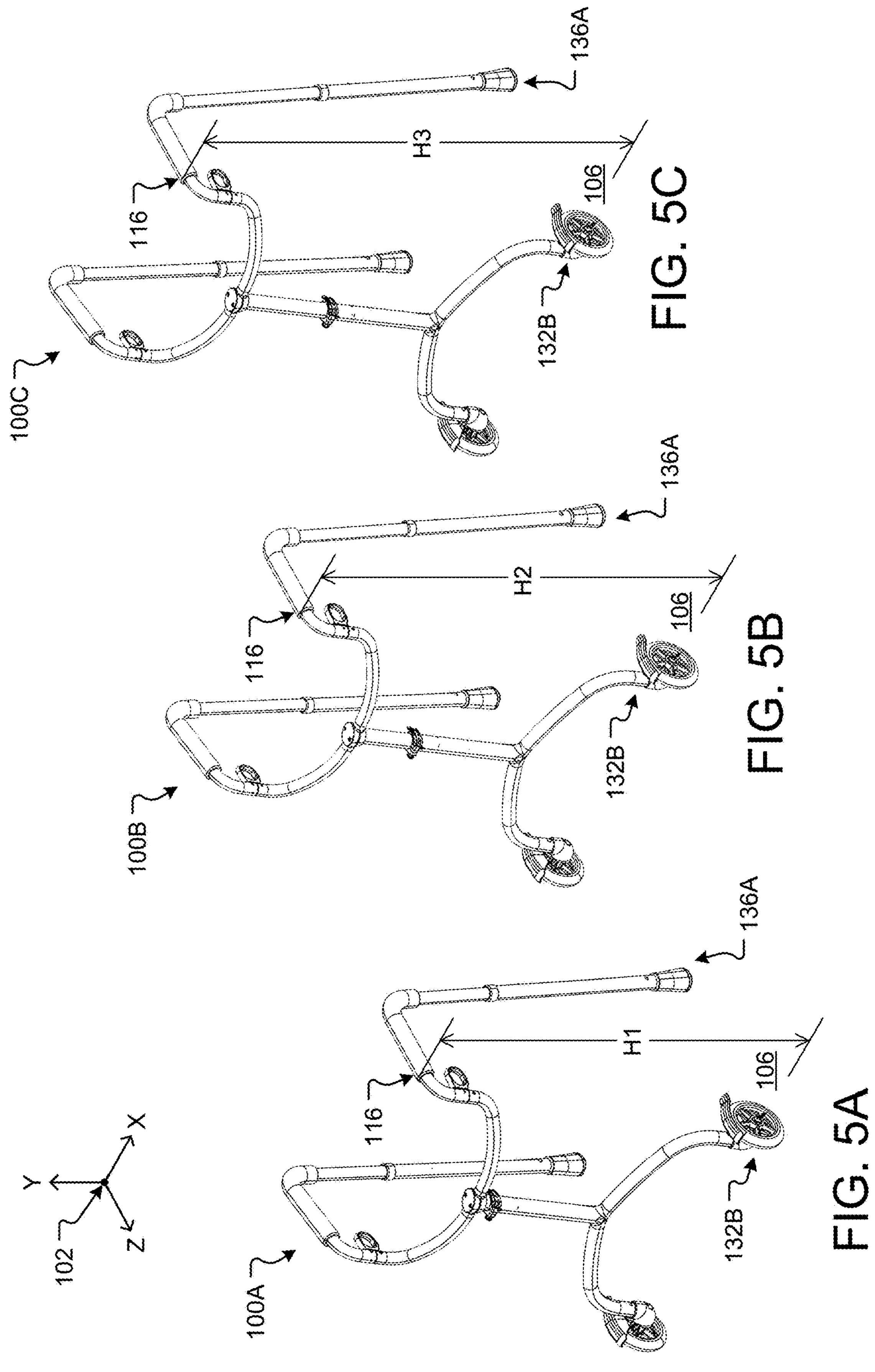
FIG. 5A is a perspective view of the walker in a first height position in accordance with examples of the present disclosure.
FIG. 5B is a perspective view of the walker in a second height position in accordance with examples of the present disclosure.
FIG. 5C is a perspective view of the walker in a third height position in accordance with examples of the present disclosure.

FIGS. 5A-5C show various handrail portion heights of the walker 100 that can be adjusted and set using a combination of the front height adjustment holes 156, the cam-lock sleeve 140, and the rear height adjustment holes 160. The heights, H1-H3, described may correspond to a distance from the upper surface of the grip sleeve 116 to the floor 106 (or bottom of the front attachments 132A-132B and/or rear attachments 136A-136B). In FIG. 5A, the walker 100 is shown set in a "low" position, where the first height, H1, is set at a first distance along the Y-axis. In one example, this first distance may be approximately 30.5 inches. In FIG. 5B, the walker 100 is shown set in a "mid" range position, where the second height, H2, is set at a second distance along the Y-axis. In one example, this second distance may be approximately 34.5 inches. In FIG. 5C, the walker 100 is shown set in a "high" position, where the third height, H3, is set at a third distance along the Y-axis. In some examples, this third distance may be approximately 37.5 inches. As can be appreciated, the distances between adjust holes in the front height adjustment holes 156 and/or the rear height adjustment holes 160 may provide greater adjustment ranges between the first height, H1, and the third height, H3, than shown in FIGS. 5A-5C. For instance, when the distance between adjust holes is 0.5 inches, the upper surface of the grip sleeve 116 may be adjusted relative to the floor 106 in half-inch increments of adjustment. When the distance between adjust holes is set to 1 inch, the upper surface of the grip sleeve 116 may be adjusted relative to the floor 106 in one-inch increments of adjustment along the Y-axis. Other distances between the adjust holes may provide additional variability. The distances between adjacent adjust holes may be equal along the length of the front height adjustment holes 156 and/or the rear height adjustment holes 160.

Figure 6B:
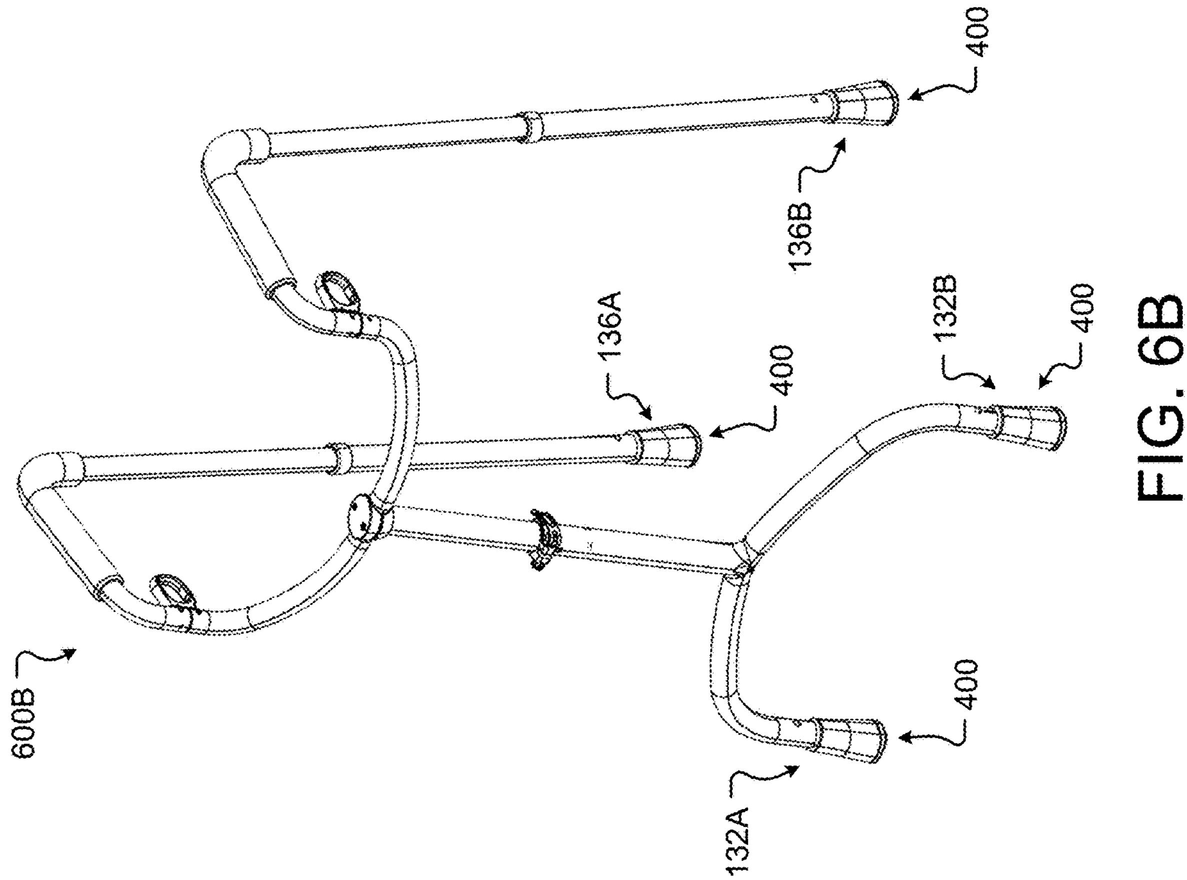
FIG. 6B is a perspective view of the walker in a second configuration in accordance with examples of the present disclosure.
Figure 6A:
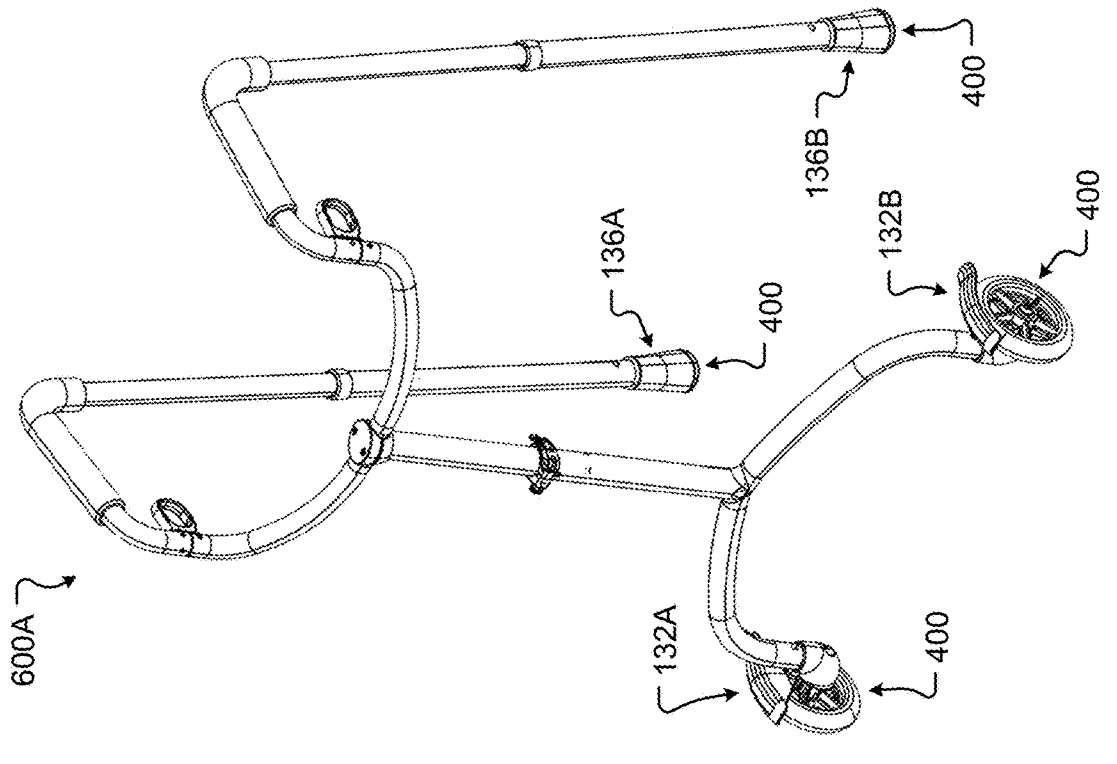
FIG. 6A is a perspective view of the walker in a first configuration in accordance with examples of the present disclosure.
Figure 7A:
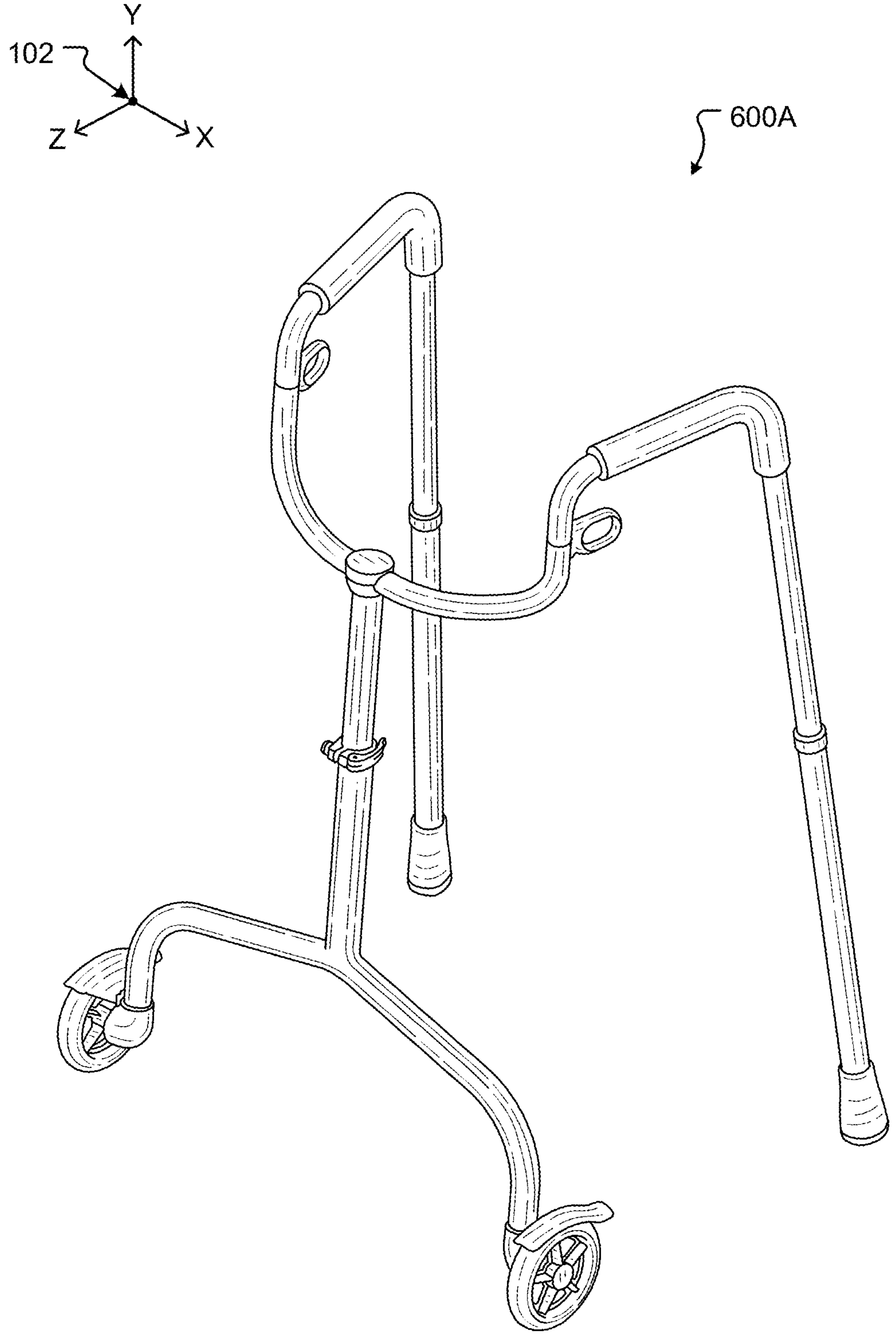
FIG. 7A is a top front perspective view of the walker in the first configuration in accordance with examples of the present disclosure.
Figure 7B:
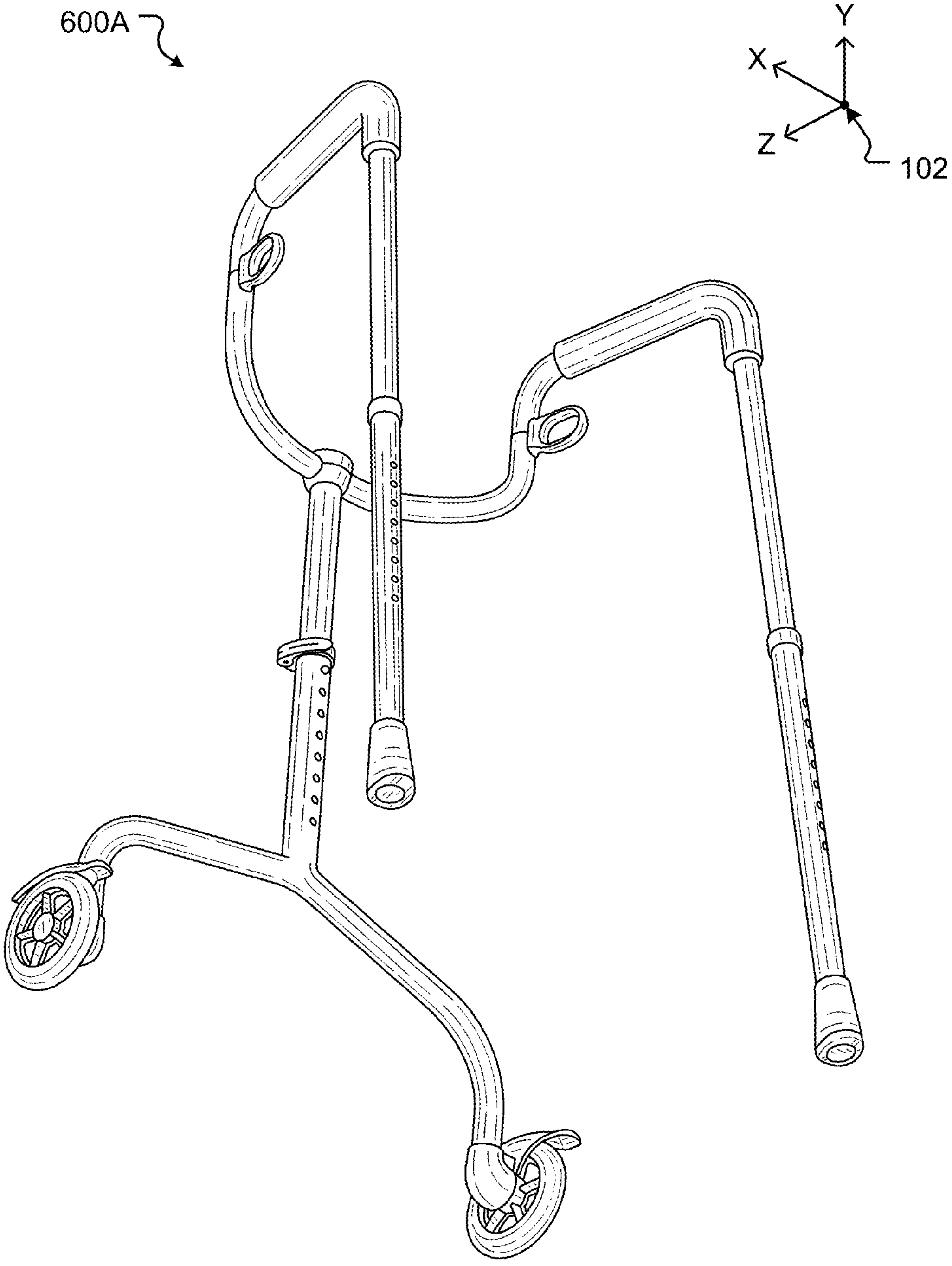
FIG. 7B is a bottom rear perspective view of the walker of FIG. 7A.
Figure 7C:
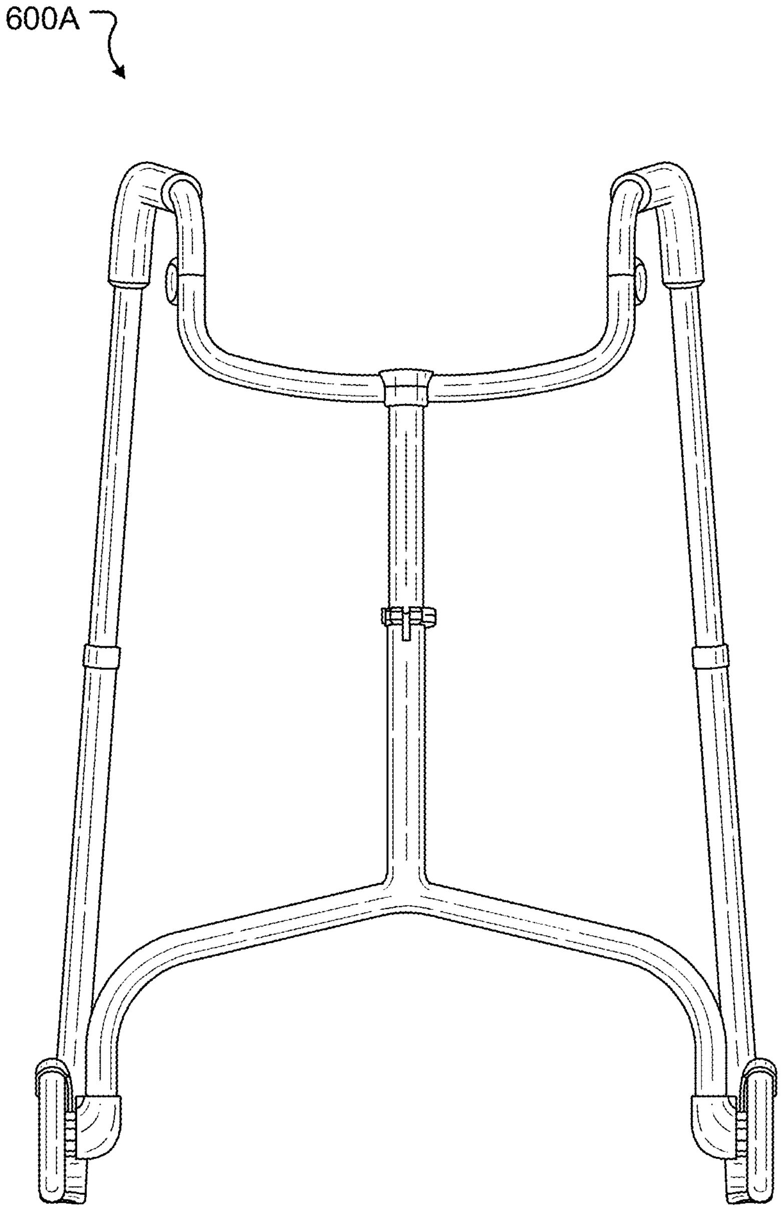
FIG. 7C is a front elevation view of the walker of FIG. 7A.
Figure 7D:
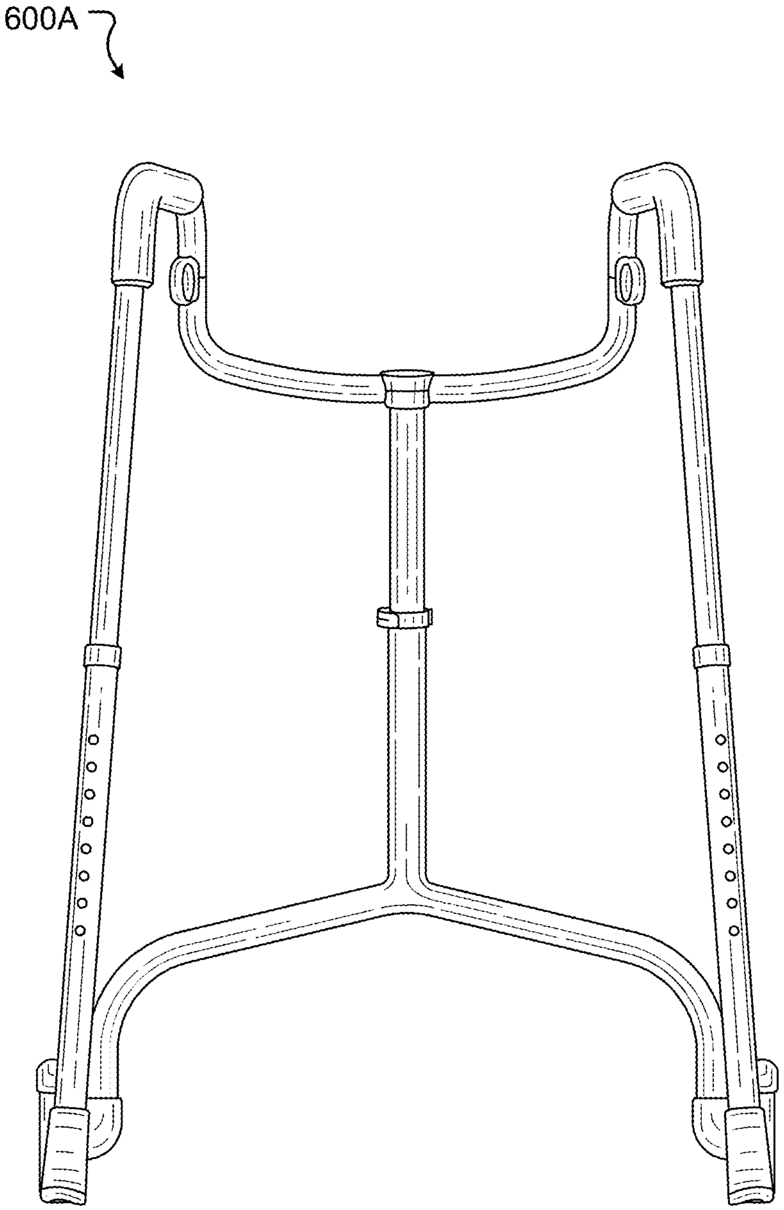
FIG. 7D is a rear elevation view of the walker of FIG. 7A.
Figure 7E:
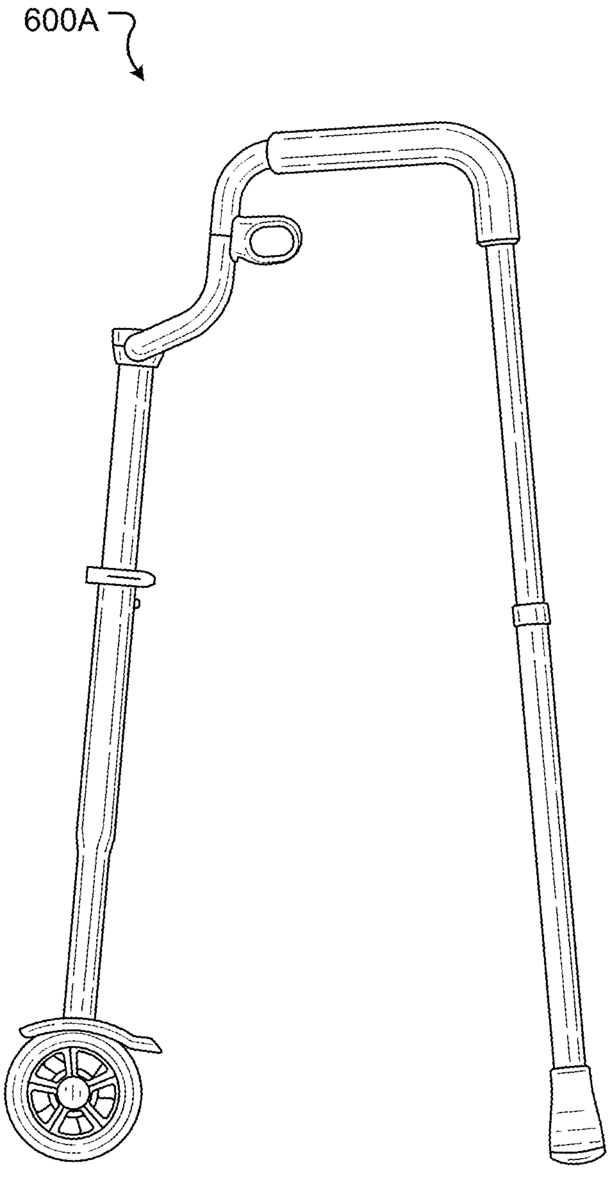
FIG. 7E is a right side elevation view of the walker of FIG. 7A.
Figure 7F:
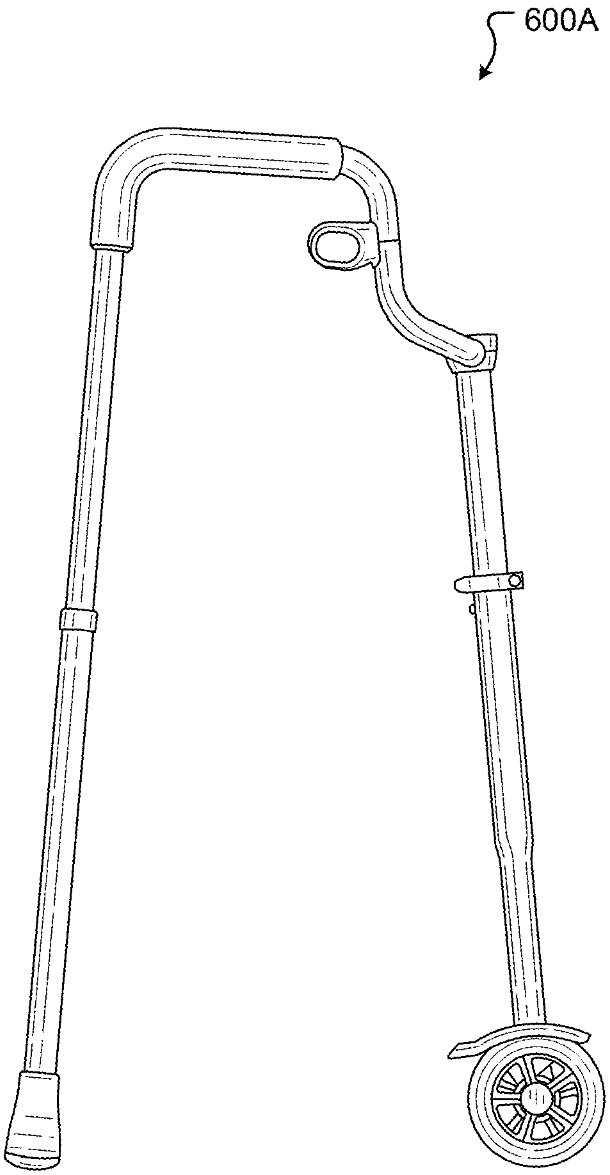
FIG. 7F is a left side elevation view of the walker of FIG. 7A.
Figure 7H:
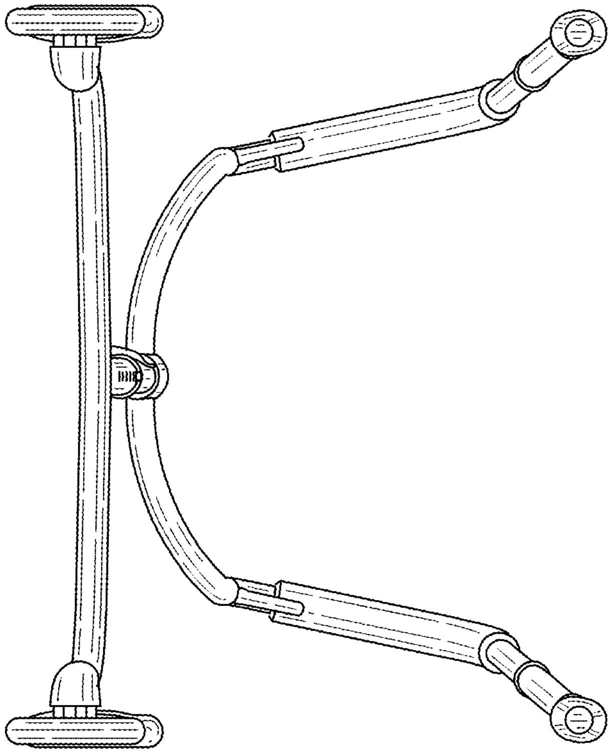
FIG. 7H is a bottom plan view of the walker of FIG. 7A.
Figure 7G:
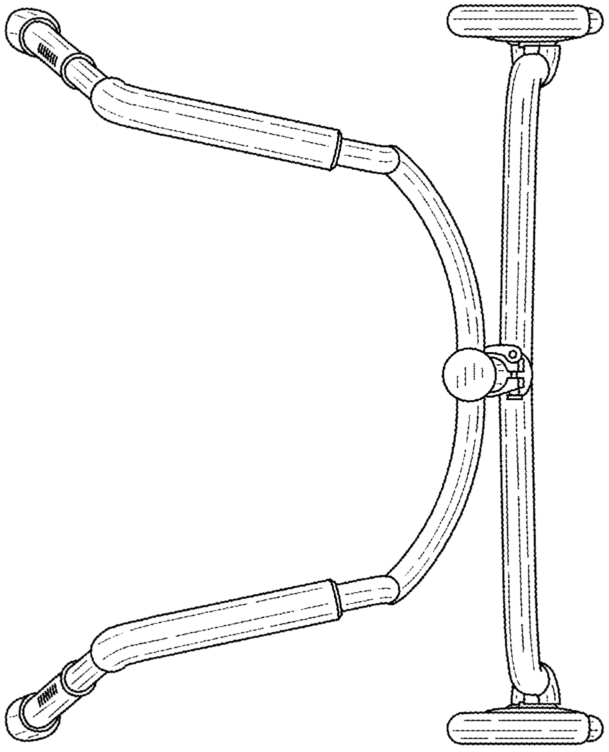
FIG. 7G is a top plan view of the walker of FIG. 7A.
Figure 8A:
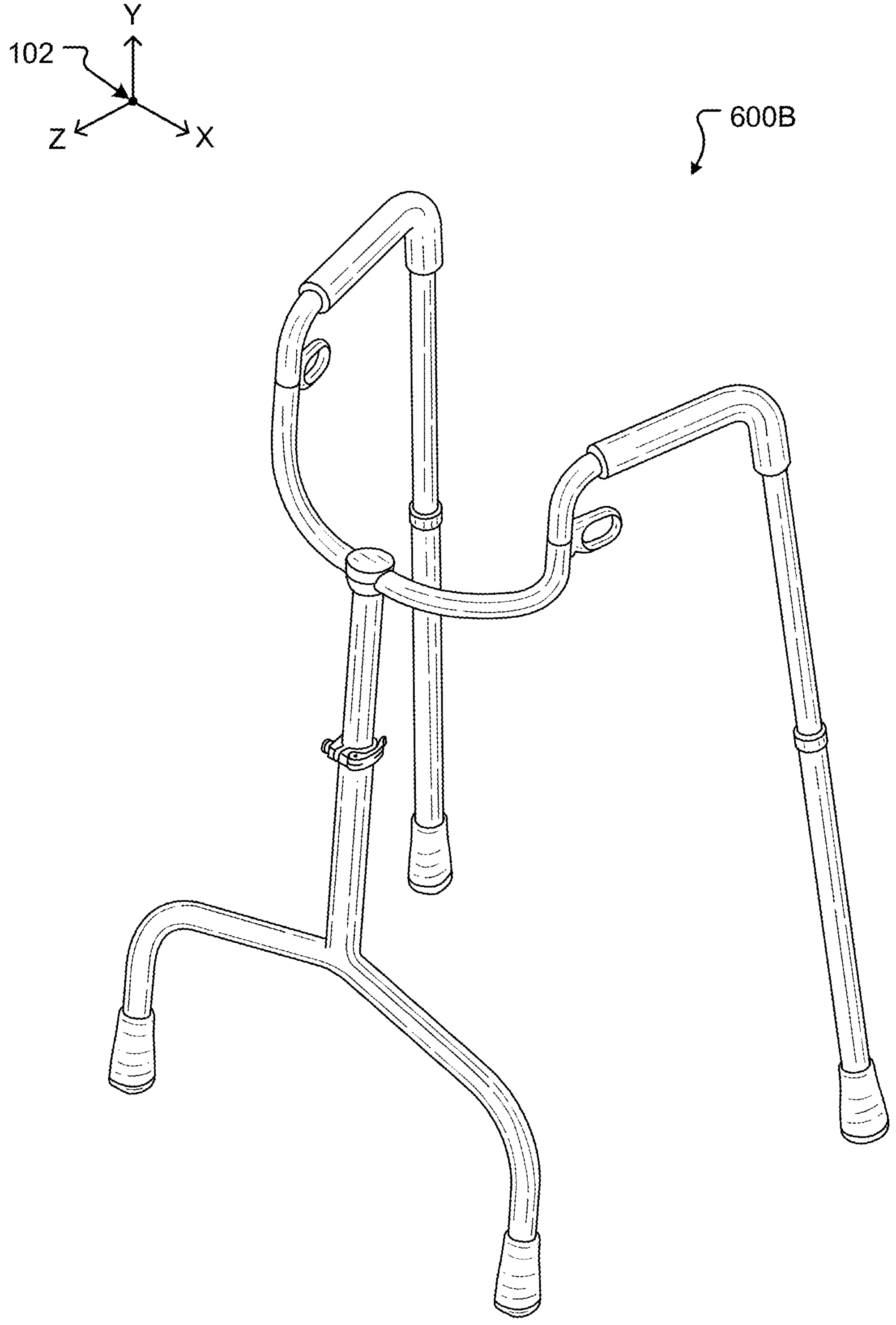
FIG. 8A is a shaded top front perspective view of the walker in the second configuration in accordance with examples of the present disclosure.
Figure 8B:
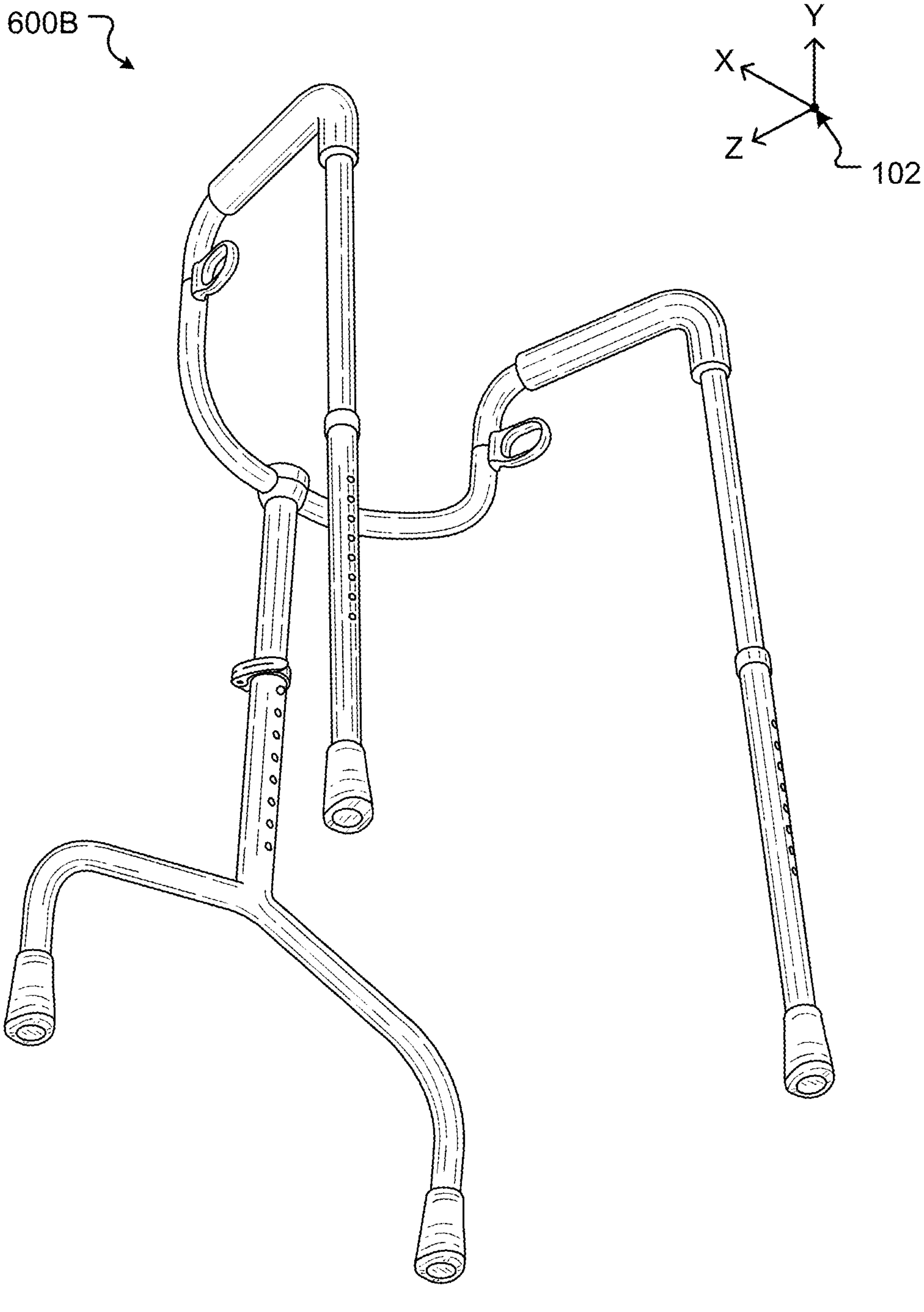
FIG. 8B is a bottom rear perspective view of the walker of FIG. 8A.
Figure 8C:
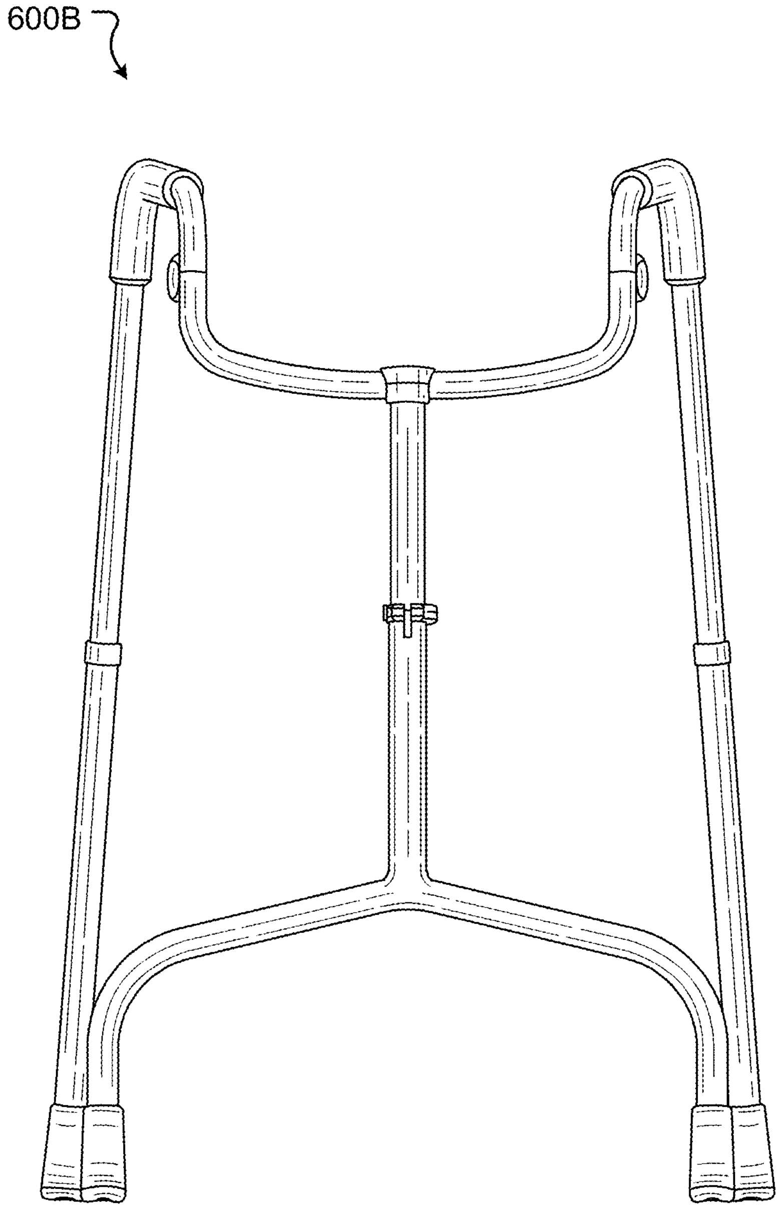
FIG. 8C is a front elevation view of the walker of FIG. 8A.
Figure 8D:
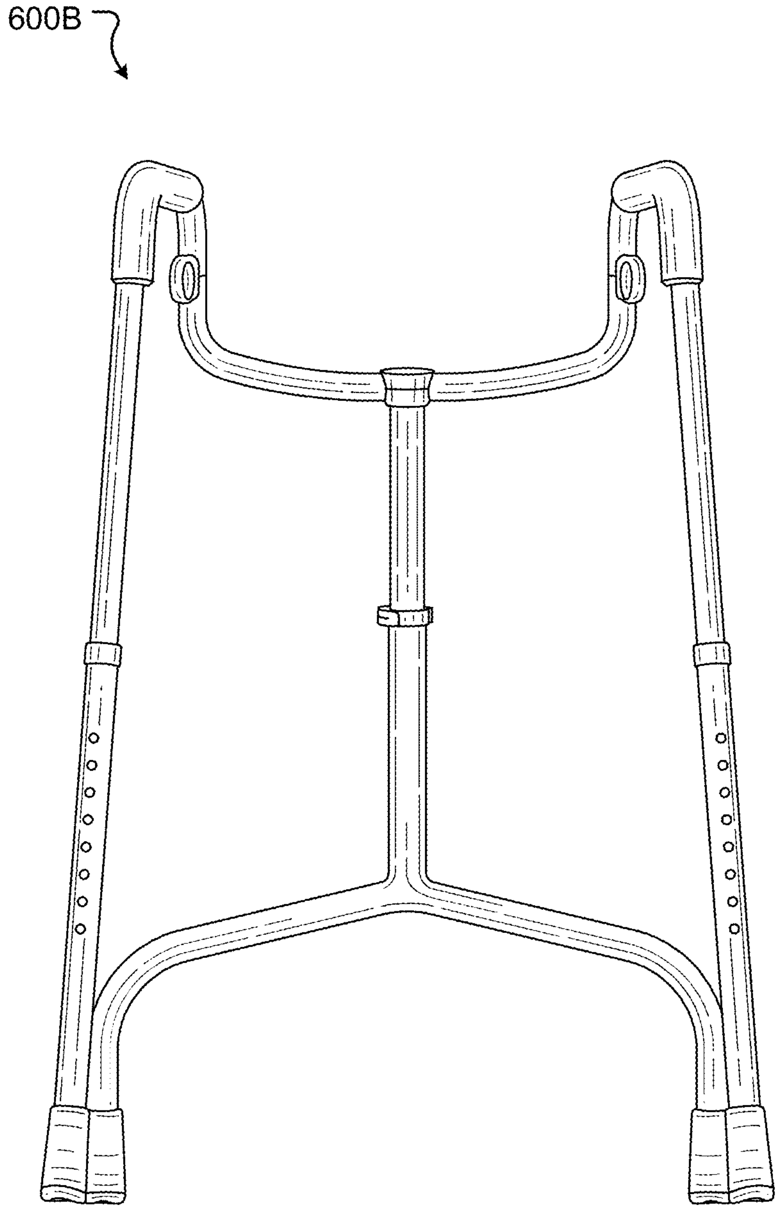
FIG. 8D is a rear elevation view of the walker of FIG. 8A.
Figure 8E:
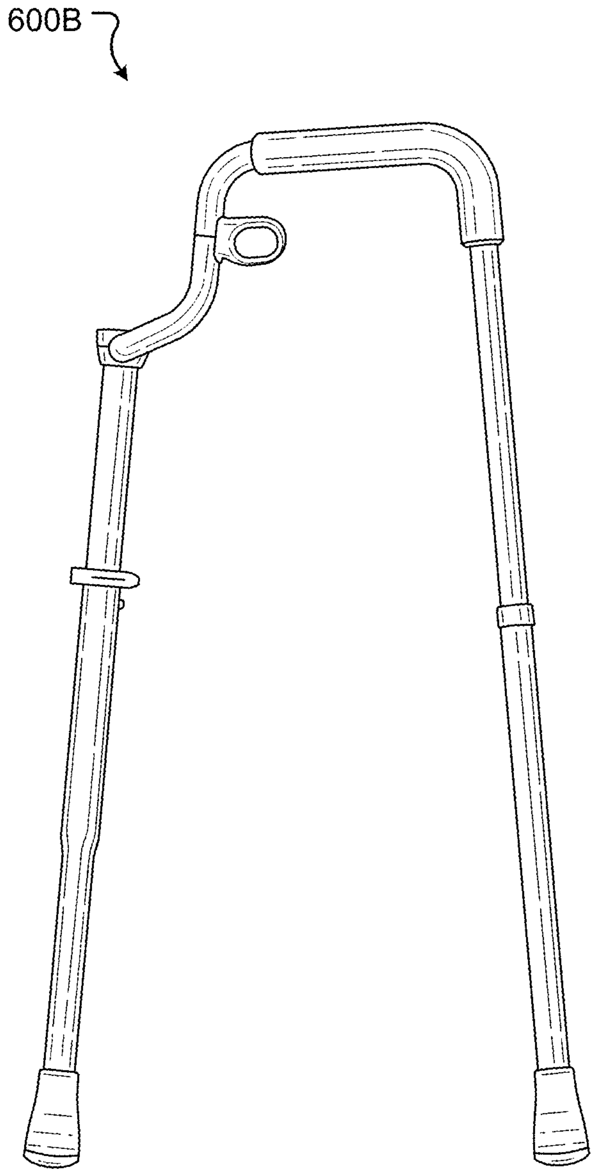
FIG. 8E is a right side elevation view of the walker of FIG. 8A.
Figure 8F:
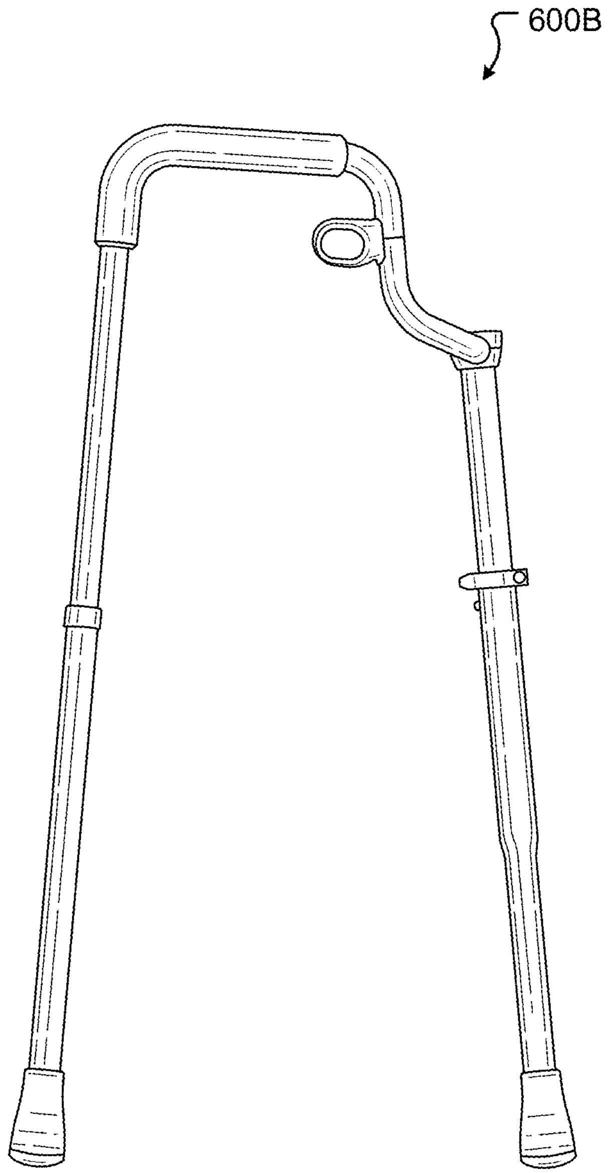
FIG. 8F is a left side elevation view of the walker of FIG. 8A.
Figure 8H:
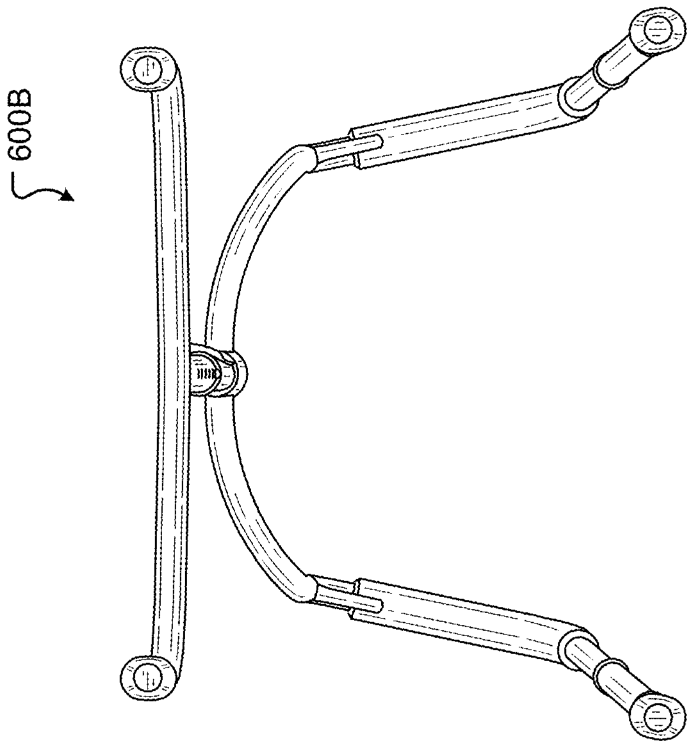
FIG. 8H is a bottom plan view of the walker of FIG. 8A.
Figure 8G:
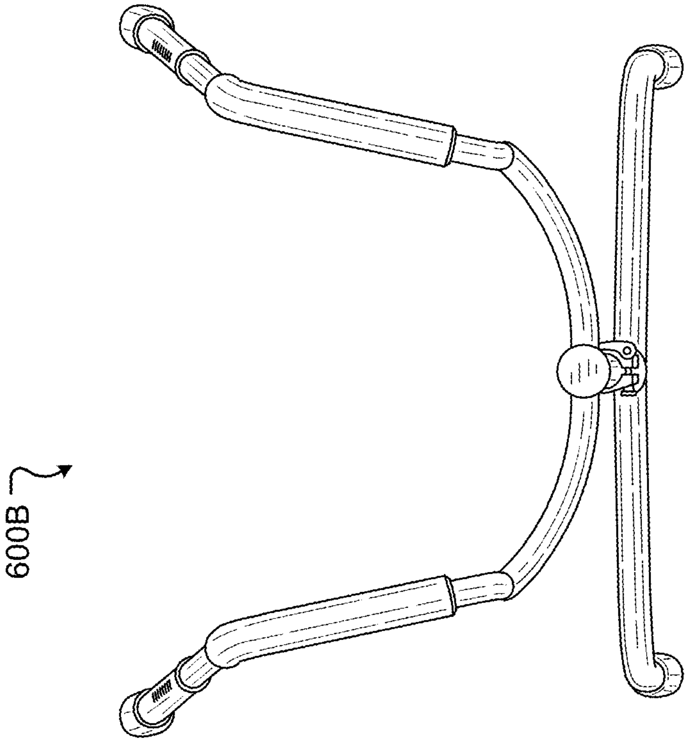
FIG. 8G is a top plan view of the walker of FIG. 8A.

FIGS. 6A-6B show various configurations of the walker 100 in accordance with examples of the present disclosure. In FIG. 6A the walker 100 is shown in a first configuration 600A having wheel assemblies 300 as the front attachments 132A-132B and foot assemblies 400 as the rear attachments 136A-136B. FIG. 6B shows the walker 100 in a second configuration 600B having foot assemblies 400 for the front attachments 132A-132B and the rear attachments 136A-136B. Other configurations and/or combinations of features may be possible. For instance, any of the front attachments 132A-132B or rear attachments 136A-136B may be removed or exchanged for a particular type of floor-contact assembly (e.g., wheel assembly 300, foot assembly 400, etc.).

FIGS. 7A-7H show additional views of the first configuration 600A of the walker 100 for illustrative purposes.

FIGS. 8A-8H show additional views of the second configuration 600B of the walker 100 for illustrative purposes.

Figure 9:
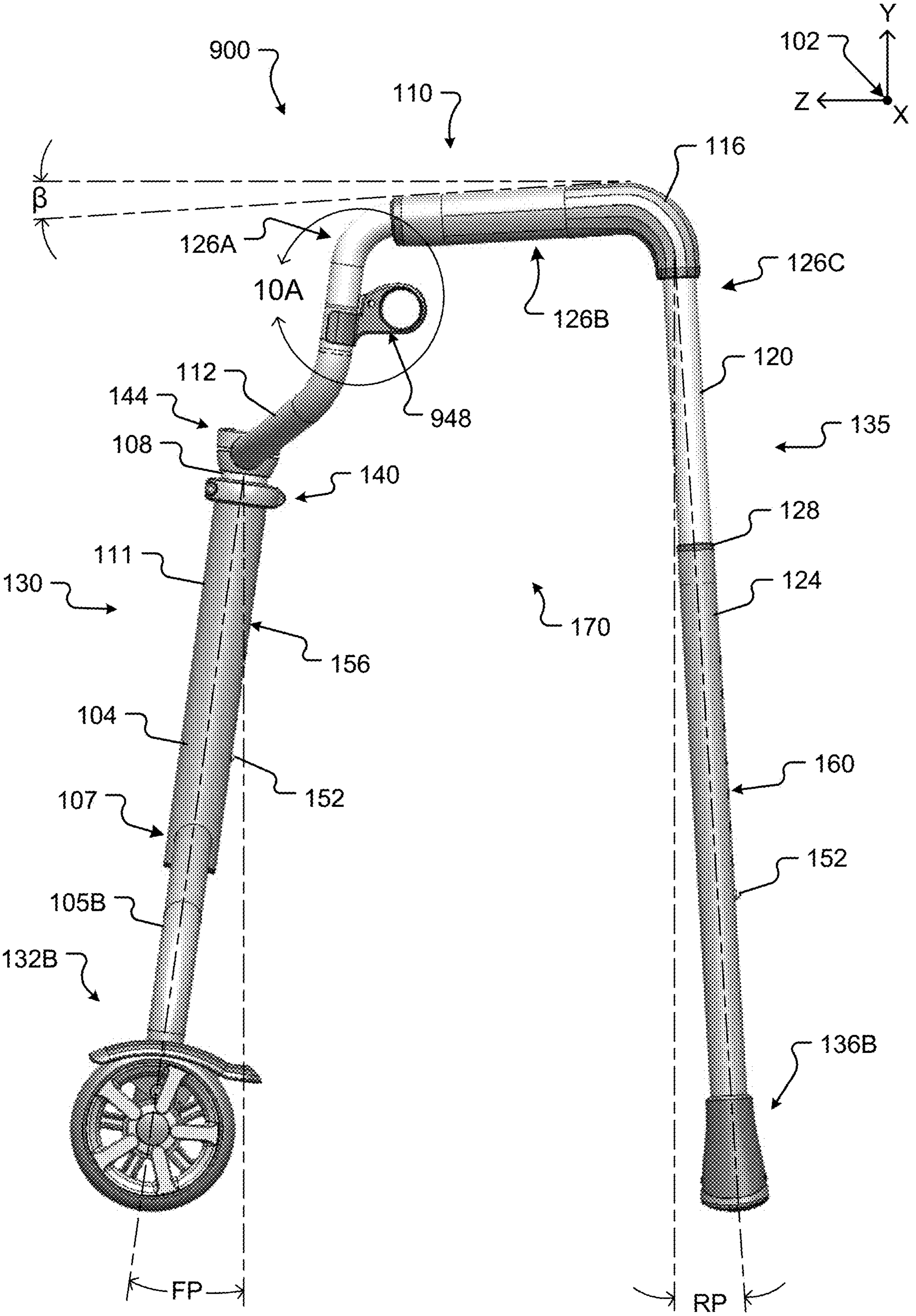
FIG. 9 is a side elevation view of a walker in accordance with examples of the present disclosure.

FIG. 9 shows a side elevation view of a walker 900 in accordance with examples of the present disclosure. The walker 900 shown in FIG. 9 may comprise one or more of the components described in conjunction with the walker 100 above. In some examples, the walker 900 of FIG. 9 may comprise a different fold-lock mechanism 948 than the fold-lock mechanism 148 of the walker 100. For instance, the fold-lock mechanism 948 of the walker 900 illustrated in FIG. 9, may pivot rather than slide. However, a user may still be able to maintain a grip on the grip sleeves 116 while actuating the fold-lock mechanism 948 described in conjunction with FIGS. 10A-10C.

Figure 10A:
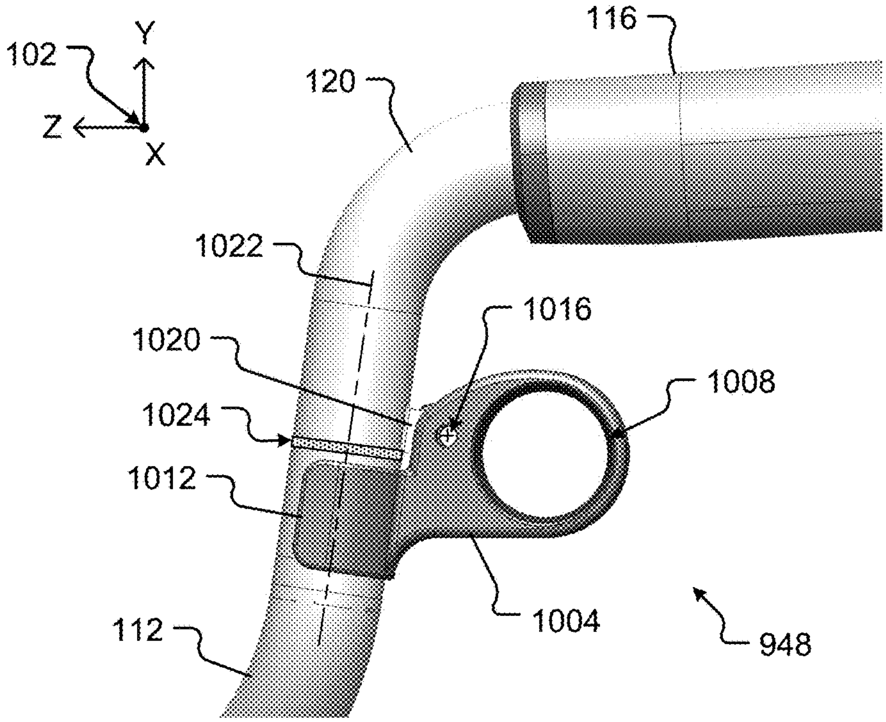
FIG. 10A is a detail side elevation view of a walker fold-lock mechanism in an unactuated state taken from circle 10A of FIG. 9 in accordance with examples of the present disclosure.

FIG. 10A is a detail side elevation view of a walker fold-lock mechanism 948 in an unactuated state taken from circle 10A of FIG. 9 in accordance with examples of the present disclosure. The fold-lock mechanism 948 may comprise a trigger body 1004 having a ring pull 1008 and a shroud 1012 portion. The fold-lock mechanism 948 may be attached to the grip tube 120 of the walker 900 at a tang 1020 extending from the grip tube 120. In one example, the fold-lock mechanism 948 may pivot about a pivot axis 1016 in the tang 1020. The pivot axis 1016 may be defined by a fastener, shoulder bolt, rivet, or other pin that allows rotation of the trigger body 1004 relative to the pivot axis 1016 of the tang 1020. In some examples, the trigger body 1004 may be spring-biased (e.g., via a torsion spring, etc.) in an unactuated, or locked, position as shown in FIG. 10A.

Figure 10B:
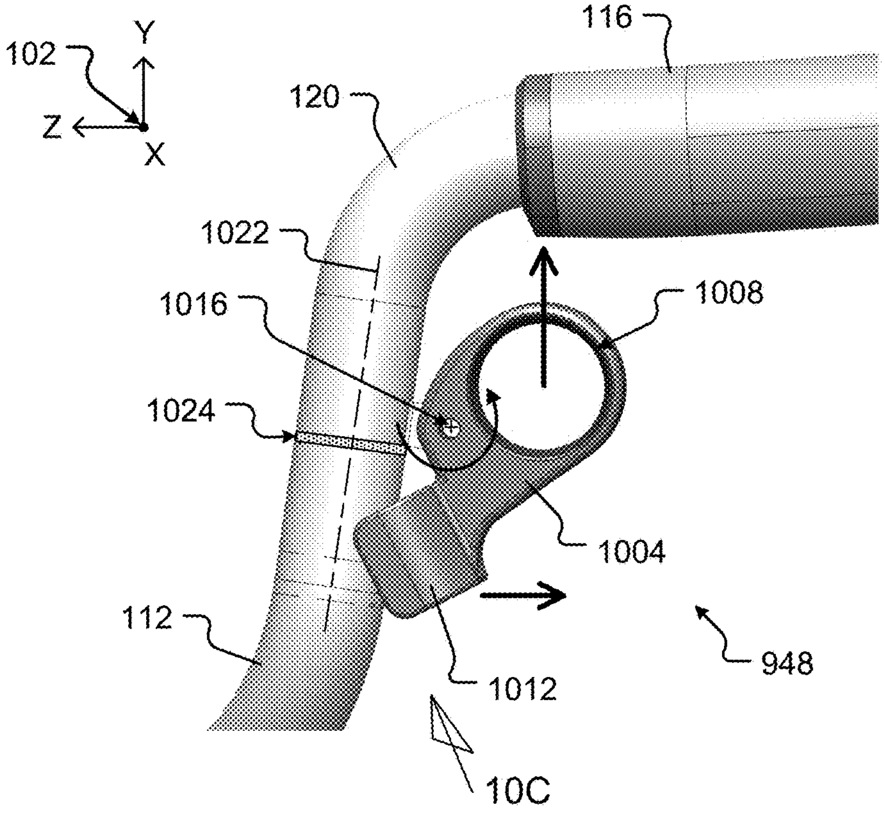
FIG. 10B is a detail side elevation view of the walker fold-lock mechanism of FIG. 10A in an actuated state.

As illustrated in FIG. 10B, a user may actuate the fold-lock mechanism 948 by pulling the ring pull 1008 of the trigger body 1004 upwardly (e.g., in the Y-axis direction) closer to the grip sleeve 116. As the ring pull 1008 is actuated, the trigger body 1004 pivots about the pivot axis 1016 and moves the shroud 1012 in a direction away from the handlebar 112. In this position, the fold-lock mechanism 948 may unlock a rotational locking between the handlebar 112 and the grip tube 120. For instance, when the fold-lock mechanism 948 is actuated and the rotation is unlocked, the grip tube 120 may be allowed to rotate about the folding axis 1022 relative to the handlebar 112. Conversely, when in the unactuated, or locked, state shown in FIG. 10A, the grip tube 120 may be prevented from rotating about the folding axis 1022 relative to the handlebar 112.

Figure 10C:
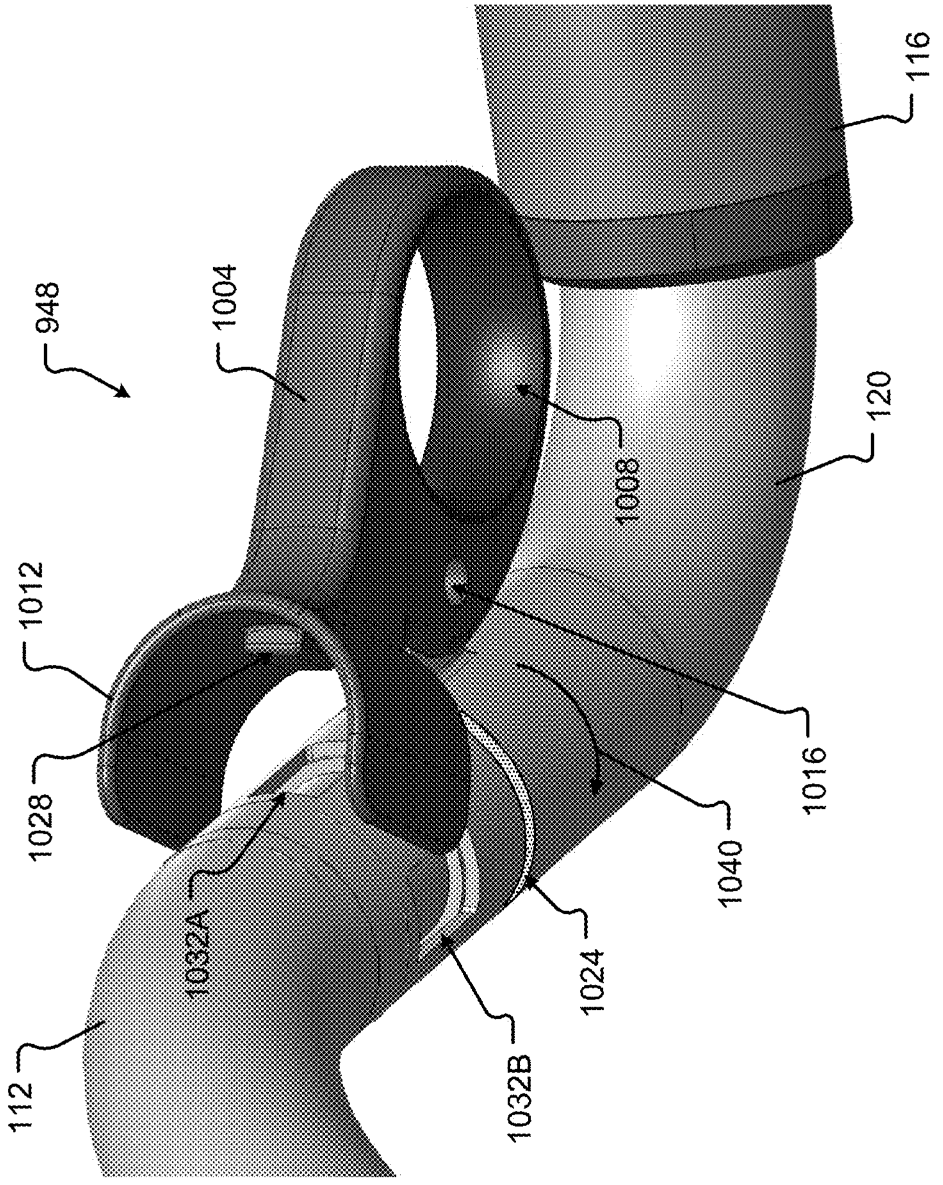
FIG. 10C is a detail perspective view of the walker fold-lock mechanism in an actuated state taken from arrow 10C of FIG. 10B.

Referring to FIG. 10C, the trigger body 1004 is shown to include at least one lock protrusion 1028, or boss, that selectively engages with the locking receptacles 1032A-1032B in the handlebar 112. By way of example, consider a scenario where the walker 900 is moved from an open state to a folded state. In this example, when the fold-lock mechanism 948 is actuated, the lock protrusion 1028 is disengaged from the first locking receptacle 1032A allowing rotation about the folding axis 1022. Continuing this example, the user may then rotate the grip tube 120 about the folding axis 1022 to a folded position where the lock protrusion 1028 aligns with the second locking receptacle 1032B in the handlebar 112. In some examples, the second locking receptacle 1032B may be arranged at 90 degrees (e.g., about the folding axis 1022) to the first locking receptacle 1032A, or vice versa. In any event, when the lock protrusion 1028 aligns with the second locking receptacle 1032B, the lock protrusion 1028 may at least partially engage with and insert into the second locking receptacle 1032B locking the rotation of the grip tube 120 relative to the handlebar 112. This movement may be applied to each grip tube 120. Moving back to the open state from the folded state may include performing the steps in reverse order. For instance, the fold-lock mechanism 948 may be actuated from the folded state (e.g., allowing rotation of the grip tube 120 relative to the handlebar 112), the grip tube 120 may then be freely rotated into the open state where the lock protrusion 1028 engages with the first locking receptacle 1032A locking the grip tube 120 relative to the handlebar 112.

The shroud 1012 may conceal each of the locking receptacles 1032A-1032B when in the folded state and when in the open state. As shown, the shroud 1012 may wrap around half of the circumference of tubing making up the handlebar 112. Additionally or alternatively, the trigger body 1004 may be actuated to a limit that releases the lock protrusion 1028 from one of the locking receptacles 1032A-1032B while still concealing the locking receptacles 1032A-1032B from view. The trigger body 1004 shown in FIGS. 10B-10C are illustrated in an exaggerated pivoted position for the sake of clarity and disclosure and should not be construed to contradict the concealing features of the shroud 1012 described herein.

As should be appreciated by one skilled in the art, aspects of the present disclosure have been illustrated and described herein in any of a number of patentable classes or context including any new and useful process, machine, manufacture, or composition of matter, or any new and useful improvement thereof.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

A number of implementations have been described. Nevertheless, it will be understood that additional modifications may be made without departing from the scope of the inventive concepts described herein, and, accordingly, other examples are within the scope of the following claims.

What is claimed is:

1. A walking frame, comprising:

a wishbone-shaped support defining a front plane of the walking frame, the wishbone-shaped support comprising:

a column extending a height in the front plane from a first end of the column to a second end of the column;

a first leg connected to the column and branching in a first direction away from the column in the front plane to a first side of the walking frame; and a second leg connected to the column and branching in a second direction away from the column in the front plane to a second side of the walking frame, wherein the second side is disposed opposite the first side;

a handlebar comprising a first tube end disposed on the first side of the walking frame and a second tube end disposed on the second side of the walking frame, wherein the handlebar is operatively connected to the column adjacent the second end of the column; and a first grip tube connected to the first tube end on the first side, the first grip tube comprising a first rail section axially aligned with the first tube end, a support rail section connected to the first rail section and bent at a first angle relative to the first rail section disposing the support rail section in an inclined plane, and a second rail section connected to the support rail section and bent at second angle relative to the first angle, wherein the inclined plane intersects with the front plane, and is angled from a lowest point adjacent the first rail section to a highest point adjacent the second rail section.

2. The walking frame of claim 1, further comprising:

a second grip tube connected to the second tube end on the second side, the second grip tube comprising a first rail section axially aligned with the second tube end, a support rail section connected to the first rail section of the second grip tube and bent at the first angle relative to the first rail section of the second grip tube, wherein the support rail section of the second grip tube is disposed in the inclined plane when the walking frame is in an opened state.

3. The walking frame of claim 2, wherein the first grip tube is rotationally engaged with the handlebar at the first tube end, wherein the first grip tube has a first locking position in the opened state of the walking frame when the second rail section is disposed on the first side, and wherein the first grip tube has a second position in a folded state of the walking frame when the second rail section is disposed adjacent the second side and is disposed adjacent the front plane of the walking frame.

4. The walking frame of claim 3, wherein the second grip tube is rotationally engaged with the handlebar at the second tube end, wherein the second grip tube has a first locking position in the opened state of the walking frame when the second rail section of the second grip tube is disposed on the first side, and wherein the second grip tube has a second position in the folded state of the walking frame where the second rail section of the second grip tube is disposed adjacent the first side and is disposed adjacent the front plane of the walking frame.

5. The walking frame of claim 4, further comprising:

a first back leg extending from the second rail section of the first grip tube; and a second back leg extending from the second rail section of the second grip tube, wherein an open carry area of the column is disposed between the first back leg adjacent the second side and the second back leg adjacent the first side, and wherein the open carry area of the column is unobstructed from a front side of the walking frame and a rear side of the walking frame when the walking frame is in the folded state.

6. The walking frame of claim 3, further comprising:

a tube slidably engaged with the column, wherein the handlebar is affixed to the tube at a stem arranged at an end of the tube, and wherein the handlebar is operatively connected to the column via the tube.

7. A walking frame, comprising:

a wishbone-shaped support defining a front plane of the walking frame, the wishbone-shaped support comprising:

a column extending a height in the front plane from a first end of the column to a second end of the column;

a first leg connected to the column and branching in a first direction away from the column in the front plane to a first side of the walking frame; and a second leg connected to the column and branching in a second direction away from the column in the front plane to a second side of the walking frame, wherein the second side is disposed opposite the first side;

a handlebar comprising a first tube end disposed on the first side, a second tube end disposed on the second side, wherein the handlebar is operatively connected to the column adjacent the second end of the column; and a first grip tube rotationally attached to the handlebar at the first tube end on the first side, the first grip tube comprising a first rail section axially aligned with the first tube end, a support rail section connected to the first rail section and bent at a first angle relative to the first rail section disposing the support rail section in an inclined plane, and a second rail section connected to the support rail section and bent at second angle relative to the first angle, wherein the inclined plane intersects with the front plane and is angled from a lowest point adjacent the first rail section to a highest point adjacent the second rail section, wherein the first grip tube has a first locking position in an opened state of the walking frame when the second rail section is disposed on the first side, and wherein the first grip tube has a second position in a folded state of the walking frame when the second rail section is disposed adjacent the second side and is disposed adjacent the front plane of the walking frame.

8. The walking frame of claim 7, further comprising:

a fold-lock mechanism arranged adjacent the first tube end of the handlebar, wherein the fold-lock mechanism, in an engaged state with a first locking receptacle of the handlebar, rotationally locks the first grip tube relative to the handlebar in the opened state of the walking frame, and wherein the fold-lock mechanism, in a disengaged state with the first locking receptacle of the handlebar, rotationally unlocks the first grip tube relative to the handlebar.

9. The walking frame of claim 8, wherein the fold-lock mechanism, in an engaged state with a second locking receptacle of the handlebar, rotationally locks the first grip tube relative to the handlebar in the folded state of the walking frame.

10. The walking frame of claim 7, further comprising:

a second grip tube rotationally attached to the handlebar at the second tube end on the second side, the second grip tube comprising a first rail section axially aligned with the second tube end, a support rail section connected to the first rail section of the second grip tube and bent at the first angle relative to the first rail section of the second grip tube, wherein the support rail section of the second grip tube is disposed in the inclined plane when the walking frame is in the opened state of the walking frame.

11. The walking frame of claim 10, wherein, in the opened state of the walking frame, the support rail section of the first grip tube and the support rail section of the second grip tube are symmetrical about a center plane running through the column and extending from a front side of the walking frame to a rear side of the walking frame.

12. The walking frame of claim 11, wherein, in the opened state of the walking frame, the support rail section of the first grip tube is flared outwardly from the center plane at a first non-zero angle running from the front side of the walking frame to the rear side of the walking frame and the support rail section of the second grip tube is flared outwardly from the center plane at a second non-zero angle running from the front side of the walking frame to the rear side of the walking frame.

13. The walking frame of claim 12, further comprising:

a first back leg attached to the first grip tube;

a second back leg attached to the second grip tube;

a first anti-rattle sleeve disposed between the first grip tube and the first back leg; and a second anti-rattle sleeve disposed between the second grip tube and the second back leg.

14. The walking frame of claim 13, further comprising:

a foot that inserts into a hollow end of at least one of the first leg, the second leg, the first back leg, and the second back leg, wherein the foot comprises:

a foot body extending from an insert end to a grip end, the foot body comprising a protrusion disposed at the insert end that clips into the hollow end;

a grip foot connected to the grip end of the foot body; and a shroud that surrounds the foot body and a portion of the grip foot and comprises a gliding surface, wherein the shroud moves axially between an uncompressed sliding position where the gliding surface extends beyond the grip foot in a direction away from the hollow end concealing the grip foot to a compressed gripping position where the gliding surface is disposed closer to the hollow end than the grip foot is to the hollow end, and wherein the grip foot, in the compressed gripping position is exposed from the shroud.

15. A walking frame, comprising:

a wishbone-shaped support defining a front plane of the walking frame, the wishbone-shaped support comprising:

a center column extending a height in the front plane from a first end of the center column to a second end of the center column;

a first leg connected to the center column adjacent the first end of the center column and branching in a first direction away from the center column in the front plane to a first side of the walking frame; and a second leg connected to the center column adjacent the first end of the center column and branching in a second direction away from the center column in the front plane to a second side of the walking frame, wherein the second side of the walking frame is disposed opposite the first side of the walking frame;

a handlebar comprising a first tube end disposed on the first side of the walking frame and a second tube end disposed on the second side of the walking frame, wherein the handlebar is operatively connected to the center column adjacent the second end of the center column; and a first grip tube rotationally connected to the first tube end on the first side, the first grip tube comprising:

a first rail section axially aligned with the first tube end;

a support rail section connected to the first rail section and bent at a first angle relative to the first rail section disposing the support rail section in an inclined plane; and a second rail section connected to the support rail section and bent at second angle relative to the first angle, wherein the inclined plane intersects with the front plane, and is angled from a lowest point adjacent the first rail section to a highest point adjacent the second rail section.

16. The walking frame of claim 15, wherein the first grip tube comprises a first locking position in an opened state of the walking frame when the second rail section is disposed on the first side, and wherein the first grip tube has a second position in a folded state of the walking frame when the second rail section is disposed adjacent the second side and is disposed adjacent the front plane of the walking frame.

17. The walking frame of claim 16, further comprising:

a fold-lock mechanism arranged adjacent the first tube end of the handlebar, wherein the fold-lock mechanism, in an engaged state with a first locking receptacle of the handlebar, rotationally locks the first grip tube relative to the handlebar in the opened state of the walking frame, and wherein the fold-lock mechanism, in a disengaged state with the first locking receptacle of the handlebar, rotationally unlocks the first grip tube relative to the handlebar.

18. The walking frame of claim 17, wherein the fold-lock mechanism, in an engaged state with a second locking receptacle of the handlebar, rotationally locks the first grip tube relative to the handlebar in the folded state of the walking frame.

19. The walking frame of claim 18, wherein the fold-lock mechanism further comprises:

a trigger body slidably attached to the first grip tube adjacent the first tube end of the handlebar, the trigger body spring-biased in a locked position.

20. The walking frame of claim 19, wherein a sliding movement of the trigger body along an outer periphery of the first grip tube moves the fold-lock mechanism between the engaged state with the first locking receptacle of the handlebar and the disengaged state with the first locking receptacle of the handlebar, wherein the engaged state with the first locking receptacle of the handlebar corresponds to the locked position, and wherein the trigger body is arranged closer to the first tube end of the handlebar when the fold-lock mechanism is in the engaged state with the first locking receptacle than when the fold-lock mechanism is in the disengaged state with the first locking receptacle.

* * * * *